(12) United States Patent
Förster et al.

(10) Patent No.: US 8,100,232 B2
(45) Date of Patent: Jan. 24, 2012

(54) ACTUATING DEVICE FOR A BRAKE

(75) Inventors: Henning Förster, Nordstemmen (DE); Thomas Groetzinger, Gehrden (DE); Detlef Gradert, Nienhagen (DE); Peter Beier, Wunstorf (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 10/487,110

(22) PCT Filed: Apr. 24, 2002

(86) PCT No.: PCT/EP02/04522
§ 371 (c)(1),
(2), (4) Date: Sep. 22, 2004

(87) PCT Pub. No.: WO03/016745
PCT Pub. Date: Feb. 27, 2003

(65) Prior Publication Data
US 2005/0029858 A1 Feb. 10, 2005

(30) Foreign Application Priority Data

Aug. 16, 2001 (DE) .................. 101 40 078
Aug. 21, 2001 (DE) .................. 101 40 953
Dec. 15, 2001 (DE) .................. 101 61 762
Dec. 21, 2001 (DE) .................. 101 63 053

(51) Int. Cl.
*F16D 55/00* (2006.01)
(52) U.S. Cl. .......... 188/72.7; 188/72.9; 74/569; 74/103; 74/99 A
(58) Field of Classification Search ............... 188/73.34, 188/156, 162, 72.9, 71.7, 71.8, 71.9, 72.7, 188/343, 20; 74/103, 99 A, 569, 522, 567; 303/20
See application file for complete search history.

(56) References Cited

U.S. PATENT DOCUMENTS

| 1,727,742 | A | * | 9/1929 | Athimon ................ 188/196 BA |
| 1,754,354 | A | * | 4/1930 | Gans ............................... 74/512 |
| 2,112,607 | A | * | 3/1938 | Pooley ............................ 74/516 |
| 3,316,776 | A | * | 5/1967 | Schroter ......................... 74/516 |
| 3,527,421 | A | * | 9/1970 | Schippers et al. .......... 242/485.9 |
| 3,946,767 | A | * | 3/1976 | Muller .......................... 139/452 |
| 3,988,945 | A | * | 11/1976 | Fasano ............................ 74/512 |
| 4,067,417 | A | * | 1/1978 | Ostrowski ..................... 188/71.4 |

(Continued)

FOREIGN PATENT DOCUMENTS

DE  195 21 401 C1  1/1997
(Continued)

*Primary Examiner* — Bradley King
*Assistant Examiner* — Thomas Irvin
(74) *Attorney, Agent, or Firm* — Kramer Levin Naftalis & Frankel LLP

(57) ABSTRACT

The invention relates to an actuation device for a brake (40, 41, 42, 43, 50), for applying an output force ($F_A$) to means (40, 41, 42, 43, 50) which generate braking force, depending on an input parameter ($F_E$), comprising a lever (1) and a force generator (7) which brings a force ($F_{Feder}$) to bear on the lever (1) at an effective angle ($\alpha$), relative to the longitudinal axis of the lever (1). Furthermore, an alternative actuating device for a brake is given, which permits a significant reduction of the power and energy requirements relative to direct-acting actuating devices. The above is achieved by means of a low-friction actuation characteristic as a result of the construction features of the actuating device and/or the selection of materials used. A preferred field of application is in electrically-driven braking systems on commercial vehicles.

20 Claims, 23 Drawing Sheets

U.S. PATENT DOCUMENTS

| | | | | |
|---|---|---|---|---|
| 4,069,722 A | * | 1/1978 | Derrick | 74/516 |
| 4,109,765 A | * | 8/1978 | Johannesen | 188/72.7 |
| 4,290,507 A | * | 9/1981 | Brown | 188/24.15 |
| 4,386,537 A | * | 6/1983 | Lewis | 74/512 |
| 4,467,704 A | * | 8/1984 | Casalone | 92/129 |
| 5,010,782 A | * | 4/1991 | Asano et al. | 74/512 |
| 5,038,824 A | * | 8/1991 | Hyde et al. | 137/607 |
| 5,076,165 A | * | 12/1991 | Pollich | 101/409 |
| 5,151,015 A | * | 9/1992 | Bauer et al. | 417/415 |
| 5,299,664 A | * | 4/1994 | Peters | 188/24.21 |
| 5,501,305 A | * | 3/1996 | Stalmeir et al. | 188/167 |
| 5,540,304 A | * | 7/1996 | Hawkins et al. | 188/24.15 |
| 5,544,537 A | * | 8/1996 | Konzal | 74/53 |
| 5,771,752 A | * | 6/1998 | Cicotte | 74/512 |
| 6,073,503 A | * | 6/2000 | Matsuno et al. | 74/55 |
| 6,128,968 A | * | 10/2000 | Nishina | 74/99 A |
| 6,332,514 B1 | * | 12/2001 | Chen | 188/72.7 |
| 6,386,336 B2 | * | 5/2002 | Mohr et al. | 188/106 F |
| 6,412,608 B1 | * | 7/2002 | Mohr et al. | 188/72.9 |
| 6,418,368 B2 | * | 7/2002 | Jinbo et al. | 701/70 |
| 6,679,366 B2 | * | 1/2004 | Tulaczko et al. | 192/99 S |
| 6,845,853 B2 | * | 1/2005 | Baumann et al. | 188/72.9 |
| 2004/0026184 A1 | * | 2/2004 | Baumann et al. | 188/72.7 |

FOREIGN PATENT DOCUMENTS

| | | |
|---|---|---|
| DE | 195 38 695 A1 | 4/1997 |
| DE | 296 22 787 U1 | 7/1997 |
| EP | 0 644 358 A1 | 3/1995 |
| WO | WO 99/16650 | 4/1999 |
| WO | WO 01/44877 A1 | 8/2001 |

* cited by examiner

ACTUATING DEVICE FOR A BRAKE

BACKGROUND OF THE INVENTION

The invention relates to a force-applying device for a brake.

A conventional force-applying device of the general type under consideration is described in International Patent Application WO 01/44677 A1. In the known force-applying device described in WO 01/44677 A1, the friction elements of a brake are clamped via a lever. A power generator acting at a variable point of the lever and provided with a preloaded spring can exert an adjustable force on the lever and thus on the brake linings by varying the power point. The operating position of this power generator can be adjusted via a servo motor, such as an electric motor. The advantage of this construction is that the power drawn by the electric motor is considerably smaller than in the case of brake application directly by the electric motor, while at the same time brake application takes place relatively rapidly and consequently the energy needed per braking action is also smaller. The major part of the energy needed to achieve brake release and the associated reloading of the spring of the power generator is then obtained from the energy stored in the brake linings and further parts of the brake as a result of elastic deformation.

The known force-applying device described in WO 01/44677 A1 already has high efficiency in terms of power draw and energy consumption, and it exhibits a favorable brake-application characteristic. The basic object of the present invention is to provide, for a brake, an alternative force-applying device that also permits considerable reduction of the power and energy demand compared with direct clamping devices.

The invention has the advantage that safe and reliable functioning of the force-applying device is guaranteed in a wide range of operating angles.

SUMMARY OF THE INVENTION

In an advantageous embodiment of the present invention, there are provided means for altering the operating angle as a function of the input variable, in such a way that the output force can be set to a desired value by adjusting the operating angle. This has the advantage that the point of power transfer to the lever can be kept constant, since the variation of the output force can now be adjusted by changing the operating angle of the power generator on the lever. Hereby the lever and the housing surrounding the lever construction can be kept compact. A further advantage is that the force effects of the power generator and of an input force derived from the input variable can be made to assist one another in order to generate the clamping force.

In another advantageous embodiment of the present invention, the input force generated for the force-applying device by a device that transforms the input variable to force is used to assist the force exerted by the power generator on the lever in brake-application direction, so that the resultant force acting as clamping force on the brake linings is increased. Hereby a further improvement of the efficiency is achieved. Moreover, the power generator can be designed smaller by that proportion contributed by the device that transforms the input variable to force.

A further considerable advantage of this configuration of the invention is that, in the event of a defect in the power generator that may lead to an inherently undesired reduction of the force component contributed by the power generator, a kind of emergency operation can be maintained for the brake system by means of the force component delivered by means of the device that transforms the input variable to force. Braking of the vehicle is then still possible, albeit with clamping force smaller than the normal maximum possible clamping force and therefore with reduced deceleration. An improvement in operating safety of the brake system can be achieved by the emergency operation. Furthermore, such a configuration contributes to greater acceptance of purely electromechanical, electronically controlled brake systems (brake-by-wire).

According to further advantageous embodiments of the present invention, the device that transforms the input variable to force acts on the lever via a device for varying the angular position of the lever. Advantageously, the device for varying the angular position of the lever is additionally a component of the means for varying the operating angle. Hereby the entire construction, namely the force-applying device and device that transforms the input variable to force, can be manufactured with few components and thus can be made particularly compact and lightweight. This is also important in particular with regard to a desired reduction of the uncushioned masses of a vehicle, whereby an improvement of driving comfort can be achieved. A further advantage is the simplified assembly and lower failure probability, by virtue of the smaller number of necessary components.

As a preferred configuration of the means for varying the angular position of the lever there can be cited a combination of a toothed gear with a toothed ring sector—integrally joined to the lever—that resembles a curved toothed rack and engages with the toothed gear. It is also possible to use a friction-gear construction or a threaded spindle connected pivotally to the lever.

In another advantageous embodiment of the present invention, the lever can be moved into a well-defined angular position in the event of failure of the input variable or of the input force. Hereby sustained braking can be avoided, as can seizing of the brakes during standstill, if for any reason the output force cannot be canceled by control of the input variable or of the input force. In a particularly advantageous manner, this can be achieved by a special configuration of the contour in the power generator, as will be explained in more detail hereinafter. In particular, a self-releasing brake characteristic can be achieved.

In a further advantageous configuration of the present invention, the lever can be moved into a well-defined end position by means of the force exerted thereon by the power generator even without effect of the input force. This has the advantage, especially in combination with a mechanical stop, by which a well-defined end position is defined, that a well-defined mechanical end position can be adjusted even without knowledge of the current brake-application position or of the lever setting and without special control measures for the input variable, and so this end position is also logically defined with regard to the control logic for the input variable. In particular, matching of the mechanical end position and logical end position can be achieved in this condition. Herewith, it is possible to compensate for variations in value ranges due to factors such as time or temperature, for example during sensing of the lever angle.

A further aspect of the present invention relates to a method for adjusting the clamping force in the force-applying device for a brake according to the present invention.

Methods for adjusting the clamping force for a wheel brake are generally known, for example, from WO 99/16650 A1 or German Patent 2962787 U1. These and similar publications have in common the fact that they relate to a wheel-brake actuator, which is operated by an electric motor via a spindle.

For cost reasons, and to economize on sensors, the actual adjusted clamping force in such cases should be determined if at all possible from the motor current. Since the construction of the force-applying device provided therein suffers from relatively large frictional losses and resulting hysteresis between brake application and brake release, however, special types of solutions tailored to the mechanical construction therein are specified.

The present invention, however, starts from a different kind of mechanical construction of the force-applying device, which is provided with a controllable actuator for adjustment of brake-application travel, via which a first clamping-force component can be delivered to the brakes by virtue of the brake-application travel, and with a power generator for delivery of an assisting clamping-force component to the brakes. With such a design, the demand for supplied energy, especially electrical energy, can be appreciably reduced relative to the known designs. A further advantage is the relatively much smaller hysteresis of the force-applying device.

For a force-applying device of the improved type according to the present invention described herein, there is a need to provide a method—which is as simple as possible to implement and which operates precisely—by which the clamping force can be adjusted according to a predetermined index value.

According to an advantageous embodiment of the present invention, the clamping force is adjusted according to a predetermined index value ($F_{Index}$) by calculating an actual value ($F_{Actual}$) of the clamping force delivered to the brake from the first clamping-force component and the assisting clamping-force component, and activating the actuator in such a way that the actual value of the clamping force corresponds to the predetermined index value. This has the advantage that no additional sensors other than the sensors needed in any case for operation are necessary for adjustment of the clamping force according to the predetermined index value. As a result, the inventive method can be employed inexpensively and preferably can be implemented by a software program block in an electronic control unit.

Depending on the type of actuator for actuation of the force-applying device, either the actuating signal that directly controls the actuator or the signal of a sensor that is present in any case, whether it is contained in the actuator or in the control device, can be used for determination of the clamping force. There is no need for separate force or pressure sensors.

Thus, in one configuration of the present invention, the clamping force can be determined from the brake-application travel. For this purpose, brake characteristics resident in a control unit are preferably used. Furthermore, the clearance must be determined beforehand, for example by evaluation of the brake-application movement, as is known from DE 19536695 A1. The brake-application travel is obtained, for example in the use of an electric motor operating on the stepping-motor principle, by the number of actuating steps in combination with a mechanical advantage factor, such as a transmission ratio. It is also possible to use, for example, an electric motor with a built-in infrared photocell, which then transmits information on the angle of rotation of the motor. This also permits conclusions about the brake-application travel and the clearance.

In the case in which an electric motor is used as the actuator, it is provided in a further advantageous configuration of the present invention that the current drawn by the electric motor can be evaluated for determination of the clamping force. In this case, the torque delivered to the force-applying device can be determined via the evaluation of a known or measured motor characteristic, which represents a relationship between motor current and starting torque of the motor.

In a particularly advantageous manner, the present invention permits logical combination of all methods discussed hereinabove for determination of the clamping force as well as further methods cited in the practical example discussed hereinafter. In particular, simple logical combination between the assisting clamping-force component contributed by the power generator and the first clamping-force component delivered by the actuator is possible.

According to an advantageous configuration of the present invention, the actual value of clamping force delivered to the brake and determined in the foregoing manner is adapted to the predetermined index value in the manner of a control adjustment. For this purpose it is advantageous to use a proportional controller, since on the one hand it is simple to implement and on the other hand it fits efficiently with the integral behavior of the control section. Moreover, because of this integral behavior, no control deviation occurs in the entire control loop.

According to an advantageous improvement of the present invention, once the predetermined index value has been adjusted, the first clamping-force component is reduced by a predetermined percentage by the actuator while the clamping force is in a holding phase. This predetermined percentage is preferably within the hysteresis range, so that the brake is not inadvertently released again. Hereby the energy drawn by an electric motor used as the actuator can be greatly reduced, as can therefore the load on the on-board electrical system. In addition, the electric motor and the associated control electronics heat up only slightly and thus are better preserved. A further advantage is that a relatively compact motor that draws little power can be used. Consequently, the control electronics can also be designed to draw little power, and so they can be manufactured at lower cost. By virtue of the shorter overall On time of the electric motor, this motor can also be designed for a shorter permissible On time.

According to an advantageous configuration of the present invention, the actual value of the clamping force is determined by stopping the electric drive periodically during a brake-application movement, determining the clamping force and, if the desired clamping force is not reached, restarting the electric drive. This method is iterated until the desired clamping force is reached. In the process, the torque delivered by the electrical drive can also be measured separately. This kind of configuration is advantageous in particular for use of electrical drives in which it is not possible simultaneously to determine the delivered force from the current drawn or to measure the current.

A further aspect of the present invention relates to a method for control of a clearance actuator for a brake of a vehicle.

A method for control of a clearance actuator is generally known from DE 19521401 C1. The known method is used for control of a brake system for a vehicle, wherein there is provided a force-applying device for a compressed-air-actuated brake as well as a brake-clearance adjuster that can be actuated independently thereof by an outside force. In the known method, it is provided in one mode of operation of the vehicle brake that first a brake demand is established, whereupon the brake clearance is closed up automatically, then the vehicle brake is applied and, after the brake demand has ended, the vehicle brake is released and finally the brake clearance is automatically set.

As regards control of a clearance actuator for a vehicle brake of the type described in the foregoing, there exists a need to provide, for control of the clearance actuator, an improved method, which is suitable in particular for use in brake systems of the brake-by-wire type, or in other words brake systems with electrical actuating energy instead of compressed air, and which is capable of intelligent control of such a brake system.

According to an advantageous embodiment of the present invention, there is provided a clearance-management function for higher-level control of subfunctions of the clearance actuator, wherein the subfunctions include at least one of the functions chosen from among the following functions: variation of the characteristic curve of input force versus brake-application travel, recognition of the maximum available clearance and selection of a mode of operation of the brake by means of the clearance actuator from a plurality of predetermined modes of operation.

This has the advantage of enabling intelligent clearance management of the brake system by taking the possible functions of an adjustable clearance actuator into consideration at a higher level. The clearance-management function can be advantageously applied not only to the wheels, for example at the level of a wheel-brake actuator, but also to the entire brake system. Depending on the type of implementation, various further advantages are obtained, as will also be explained in more detail hereinafter.

A further aspect of the present invention relates to a method for ascertaining the embodiment of an electric brake actuator, or more precisely for ascertaining a correlation between the direction of movement of an electric actuator and the direction of movement of a force-applying device that is in active mechanical communication with the electric actuator, the actuator and device being constituents of an electrically actuatable brake actuator for a vehicle brake. Such an electrically actuatable brake actuator is known, for example, from WO 01/44677 A1, cited above.

In brake systems of the brake-by-wire type, which are controlled purely by electrical means and are supplied with electrical energy, a brake actuator is allocated to each wheel of a vehicle, or to each wheel group in the case of commercial vehicles. Considering the front axle, for example, there are usually disposed one brake actuator on the left front wheel and one brake actuator on the right front wheel. With regard to the mechanical design of the force-applying device, the brake actuator for the left side of the vehicle is designed as a mirror image of the brake actuator to be disposed on the right side, for reasons of installation space, for example. For reasons of maximum possible efficiency in the manufacture of brake actuators, it is desirable to use as many identical parts as possible for the left and right brake actuators, such as parts of a transmission mechanism (kinematic chain), the electric actuator (electric motor) and an electronic control device that activates the electric actuator. Depending on the embodiment of the brake actuator, it may be, for example, that such an electric actuator provided for the left brake actuator has to apply the brakes while rotating counterclockwise and to release them again while rotating clockwise, whereas an electric actuator of the same type in the right brake actuator then operates with precisely the opposite direction of rotation. In other words, it applies the brakes while rotating clockwise and releases them again while rotating counterclockwise.

Starting from this point, there exists a need to provide, for ascertaining a correlation between the direction of movement of the electric actuator and the direction of movement of a force-applying device in active mechanical communication with the electric actuator, a method which can be executed, for example, by the electronic control device. According to an advantageous embodiment of the present invention, the following steps are provided for determination of the cited correlation:

a) subjecting the electric actuator to a predetermined test cycle, in which the electric actuator is moved in a first direction of movement, b) checking whether, due to the actuation of the electric actuator in the first direction of movement, the force-applying device performs a movement in brake-application direction, c) storing the correlation between the first direction of movement of the electric actuator and brake-application direction when the force-applying device is performing a movement in brake-application direction, and d) storing the correlation between a second direction of movement of the electric actuator and brake-application direction when the force-applying device is not executing a movement in brake-application direction.

This improvement has the advantage that it can be implemented by means of very few program steps with little complexity in an electronic control device, which is provided in any case in the brake actuator for electrical control of the electric actuator. Hereby it is possible to use, for the left and right brake actuators, control devices of identical design that then automatically establish a correlation of the directions of movement, for example during startup for the first time or installation of the brake system in the vehicle.

According to an advantageous embodiment of the present invention, a test cycle in which the electric actuator is urged in order to correlate the directions of movement is designed to ensure that the brake clearance cannot be closed up by a potential brake-application movement. This can be achieved in a practical implementation by limiting the duration of the test cycle, for example. Hereby the possibility of inadvertent response of the brake during execution of the inventive method can be prevented. A further advantage is that the method can also be executed during driving operation, without the occurrence of any kind of negative effects due to undesired braking.

In certain cases, for example during replacement of parts of the brake during a repair, the test cycle may also include a movement that goes beyond the brake clearance. According to an advantageous embodiment of the present invention, the correlation method is executed automatically when none of the possible correlations is already stored. This has the advantage that the correlation is automatically determined after startup of the brake system for the first time, and so manual intervention is not necessary to initiate the correlation method. Hereby working time and costs can be saved in the manufacture of brake actuators and of vehicles equipped therewith.

According to a further advantageous embodiment of the present invention, the electric actuator is actuated in the second direction of movement as part of a second test cycle in order to verify the stored correlation. In the process, the movement performed by the force-applying device is noted. Hereby greater safety is achieved in recognizing the correlation. In particular, if the first test cycle executed begins at completely released position of the force-applying device, no further release of the force-applying device can be achieved by urging the electric actuator in brake-release direction. Consequently, no movement of the force-applying device can be observed, and so it is not possible to distinguish reliably whether the first direction of movement of the electric actuator correlates with the brake-release direction, or whether the electric actuator is perhaps defective and thus is not initiating any movement of the force-applying device. By virtue of the second test cycle in the second direction of movement, it should be possible to observe movement of the force-applying device as long as the brake actuator is not defective. If no movement is observed, an error detection and indication signal can be transmitted.

According to a further advantageous embodiment of the present invention, the test cycle and/or the second test cycle includes a limitation of the actuating time and/or of the actuating current of the electric actuator. Hereby damage to the electric actuator, force-applying device and other brake parts can be prevented. In addition, because of the limitation of the actuating time, the inventive method is ended at the latest at a well-defined, predictable instant at which it then yields information about the correlation or if applicable a defect in the electric actuator or other parts of the brake actuator.

According to an advantageous embodiment of the present invention, a value above a current limit value of the actuating current of the electric actuator is used as an indication that the force-applying device is not performing any movement in the brake-application direction. Especially in the case where the force-applying device is already completely in the released position, no further release is possible, and so the electric actuator is blocked and consequently it draws a larger current than in the unblocked case. This is advantageously recognized by the present invention, and so the electric actuator can be turned off relatively rapidly in order to prevent damage.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

The present invention will be explained in more detail hereinafter and further advantages will be pointed out on the basis of practical examples with reference to the accompanying drawings, wherein.

In the figures, like reference symbols are used for parts, signals and other variables that correspond to one another.

DETAILED DESCRIPTION OF THE PREFERRED EMBODIMENTS

Figure 1:
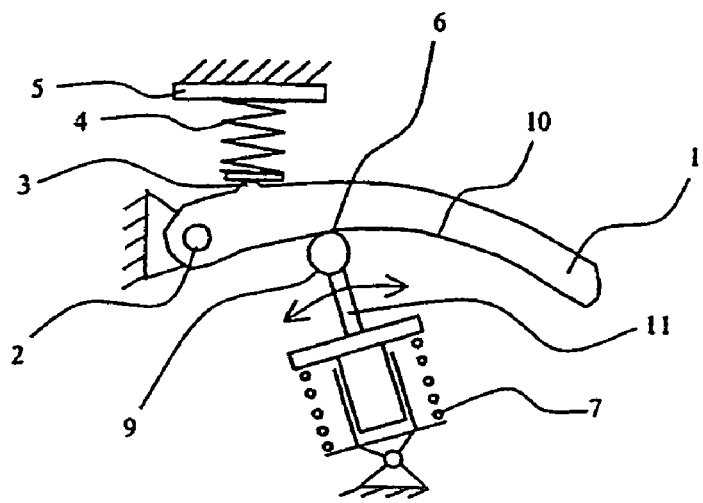
FIGS. 1 to 9 show block diagrams of various principles of mechanical devices for delivery of an output force and FIG. 10 shows a diagram of the principle of action of the force-applying device and FIGS. 11 to 13 show a practical example of a first embodiment of an electromechanical brake at various brake-application settings and FIGS. 14 to 16 show a practical example of a second embodiment of an electromechanical brake at various brake-application settings and FIG. 17 shows examples of characteristics of a motor torque that applies the input force versus the brake-application angle and FIG. 18 shows an advantageous curve of the torque component injected by the power generator into the lever versus the brake-application angle and FIG. 19 shows preferred embodiments of the contour of the power generator and FIG. 20 shows preferred functional curves $f_{Contour}$ of the operating angle and FIGS. 21 and 22 show characteristics of the clamping-force components and of the motor current versus the lever angle and FIGS. 23 to 24 show a preferred practical example of the inventive method in the form of a flow diagram and FIGS. 25 to 29 show characteristics of the input force versus the lever angle with variation of the clearance and FIG. 30 shows a flow diagram of an advantageous method for variation of the characteristic curve of the input force versus the brake-application travel and FIG. 31 shows a flow diagram of a further advantageous method for variation of the characteristic curve of the input force versus the brake-application travel and FIG. 32 shows a flow diagram of an advantageous method for recognition of the maximum available clearance and FIG. 33 shows a state transition diagram of advantageous modes of operation of the clearance actuator and FIGS. 34 and 35 show an advantageous configuration of the inventive method in the form of a flow diagram.
Figure 2:
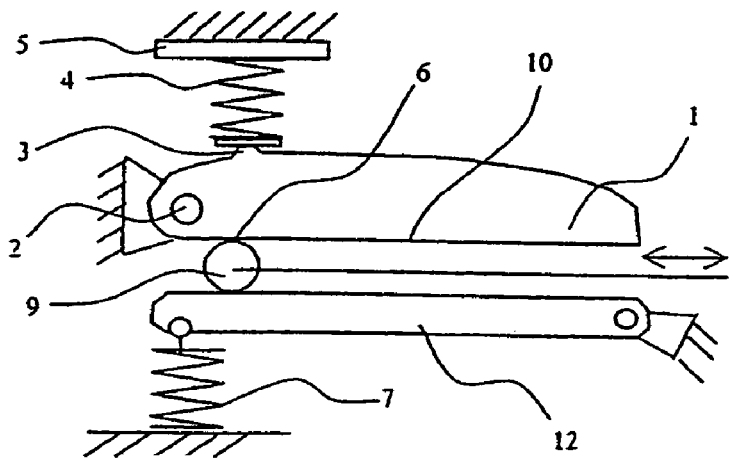
Figure 3:
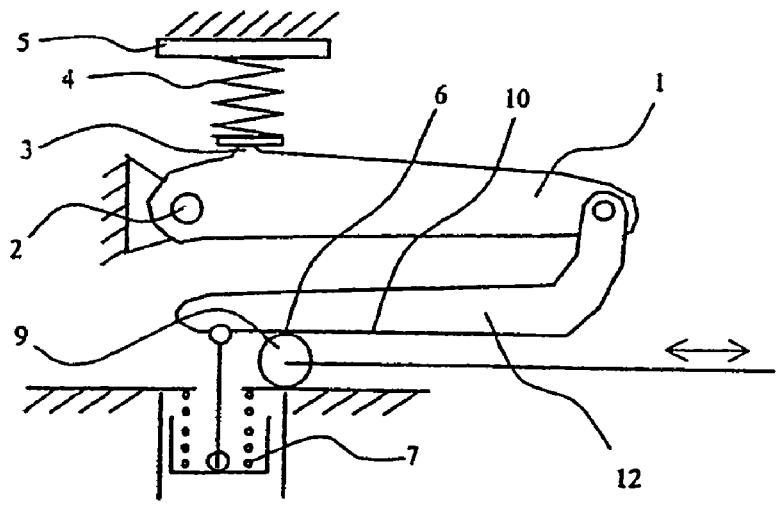
Figure 4:
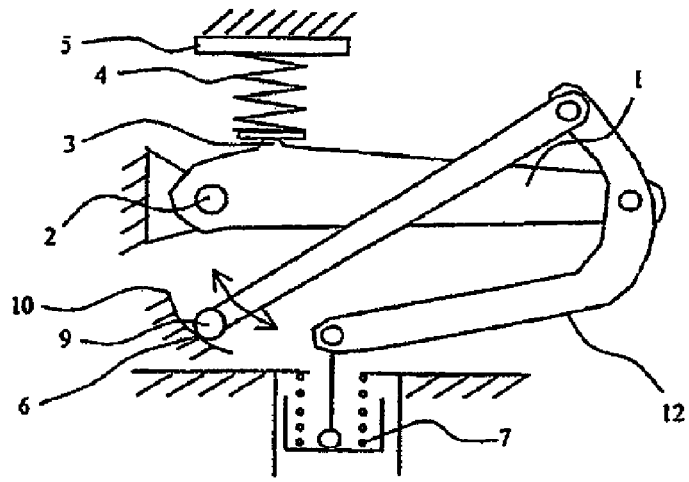
Figure 5:
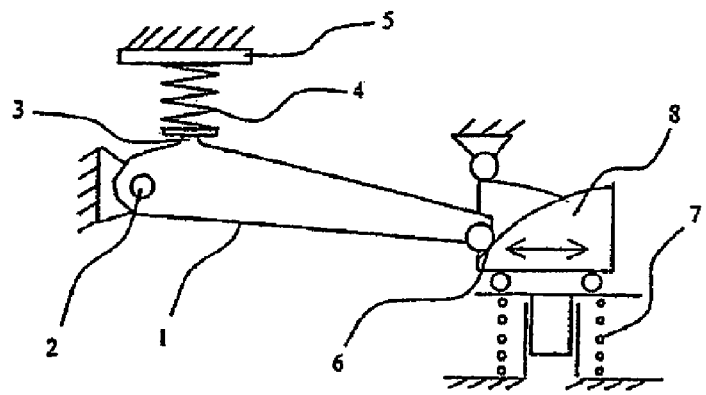

In the prior art, a mechanical device for delivery of an output force as a function of an input variable, especially an input force, is preferably implemented by means of a lever construction. A desired ratio between input force and output force can be adjusted via the effective lever lengths. As is known, the total balance of the torques acting on such a lever must have a value of zero. Thus the output force is equal to the input force multiplied by the ratio of the lever-arm length at which the input force is applied and divided by the lever-arm length at which the output force is taken off. Since such levers are usually mounted on a fulcrum and supported pivotally there, as is also illustrated in FIGS. 1 to 9, the lever lengths are usually defined relative to that fulcrum.

For variation of the output force, there exist the following options, which also permit a considerable reduction of the power and energy demand compared with direct clamping devices:

1. The input force is varied. An example of this type of variation of the output force is given in FIG. 5. A lever (1) is fastened to a fulcrum (2) and supported pivotally there. At force-delivery point (3), lever (1) delivers the output force to a force-receiving device (4, 5). In the schematic diagram of FIGS. 1 to 9, where the mere principle is illustrated, force-receiving device (4, 5) is represented as a spring (4) and a stop (5) having fixed position. At a power-transfer point (6), the input force, which in this case also forms the input variable, is transmitted into lever (1).

This input force is transferred from a power generator (7) via a force-modulating mechanism (8) to power-transfer point (6). In FIGS. 1 to 9, the power generator is represented for simplicity as a preloaded spring. Other embodiments are also conceivable and advantageously usable for the power generator, as will also be explained hereinafter.

Force-modulating mechanism (8) is used for adjustment of the input force transferred by power generator (7) to power-transfer point (6). For this purpose, two inclined surfaces joined integrally to one another are provided in the horizontally movable embodiment according to FIG. 5. These two surfaces are disposed such that their inclinations face in opposite directions. Thus one surface is braced on lever (1) at power-transfer point (6), while the other surface is braced on a roller disposed in fixed position relative to power generator (7). During a displacement of the surfaces, the force transferred to power-transfer point (6) is increased and thus the output force is also increased in proportion thereto, while the force transferred at the positionally fixed roller is simultaneously reduced. In this embodiment of the mechanical device, the lengths of the lever arms are constant.

2. A further option for influencing the output force comprises a variation of the lever-arm length, which is possible by variation of the lever arm transferring the input force, of the lever arm transferring the output force, or of both lever arms. In FIGS. 1 to 4, the variation of the lever arm transferring the input force is illustrated. In this case the force delivered by power generator (7) is transferred to lever (1) preferably via an adjustable mechanism at a power-transfer point (6) that is not fixed and is therefore variable. For this purpose, a specified contour (10) is provided on lever (1), each point of this contour (10) representing a possible power-transfer point. On this contour (10) there bears a translation device (9) maintained under load by power generator (7) and preferably comprising a roller that can travel along contour (10). In the embodiment of FIG. 1, the translation device (9) is mounted on a rod (11) whose angle is adjustable. In the embodiments according to FIGS. 1 to 4, the adjustment of power-transfer point (6) represents the input variable. In each of the embodiments of FIGS. 2 to 4, mechanical assist means (12) are also provided for transfer of the force of power generator (7) to lever (1).

3. Finally, a third option for variation of the output force comprises a variation of the angle of action of the force delivered by power generator (7) to lever (1). Preferred embodiments for this purpose are shown in FIGS. 6 to 9. A common feature of all embodiments is that the power point (18) on lever (1) can be disposed at a fixed position if desired. In other words, the effective lever-arm length between the power point (18) and fulcrum (2) is constant. In the following practical examples, the power point (18) is disposed in the region of the end of lever (1) remote from fulcrum (2).

Figure 6:
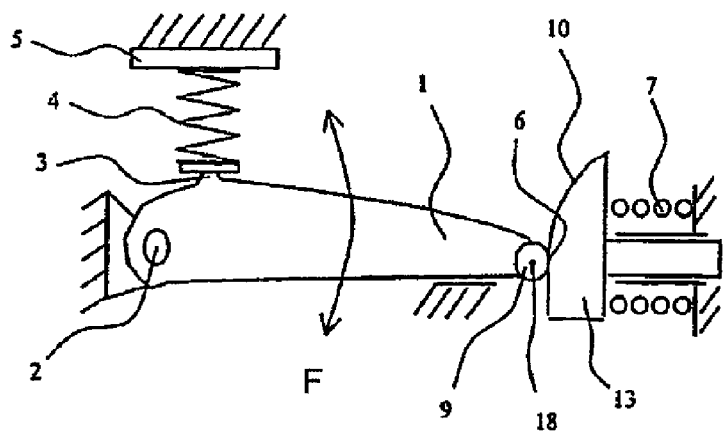

In FIG. 6, a power-transfer member (13) as well as a translation device (9) is disposed between power generator (7) and lever (1). Power generator (7) acts on translation device (9) at a power-transfer point (6). Translation device (9) in turn acts on lever (1) at power point (18), which simultaneously is the point of mechanical connection between lever (1) and translation device (9).

Power-transfer member (13) is provided with a contour (10) on its side facing lever (1). Stated in generalized terms, contour (10) can also be regarded as a spatial curved path of a point—namely power-transfer point (6)—that must be moved along it. Contour (10) is designed such that a translation device (9) can be moved along it. In a preferred embodiment of the invention, translation device (9) is designed as a rotatable roller disposed integrally on lever (1) and having as fulcrum power point (18). Further advantageous embodiments of translation device (9) include any type of sliding or rolling bearing, such as a sliding pad, a sliding block, a sliding rail or a ball bearing, to mention only some examples.

To cause movement of translation device (9) on contour (10), lever (1) must be swiveled around fulcrum (2) in the directions indicated by the double arrow in FIGS. 6 to 9. In the position of lever (1) illustrated in FIG. 6, its longitudinal axis, which can be imagined as the line through the power point (18) and fulcrum (2), is aligned with the force-delivery direction of power generator (7). During an adjustment of lever (1), starting from the zero position defined hereinabove and representing a dead center, power generator (7) causes delivery of force to lever (1), thus creating a torque around fulcrum (2) as a result of the angular difference relative to the force-delivery direction of power generator (7). Thus a "virtual lever arm", which will be described in more detail below on the basis of FIG. 10, is developed as a result of the angular difference. If contour (10) is suitably designed, the torque acts in the direction of adjustment of lever (1). In other words, an external input force acting on lever (1) in order to adjust it is assisted by a force component delivered by power generator (7).

With increasing lever adjustment starting from the dead center, power generator (7) also acts on power-transfer point (6) at an increasingly more inclined angle, and so the length of the virtual lever arm increases and hereby the assisting force component of power generator (7) also increases. By suitable design of contour (10) it is possible on the one hand to define the point at which the assisting action of power generator (7) begins and on the other hand to adapt the characteristic of the force assistance to the respective purpose via the adjustment angle of lever (1).

Figure 7:
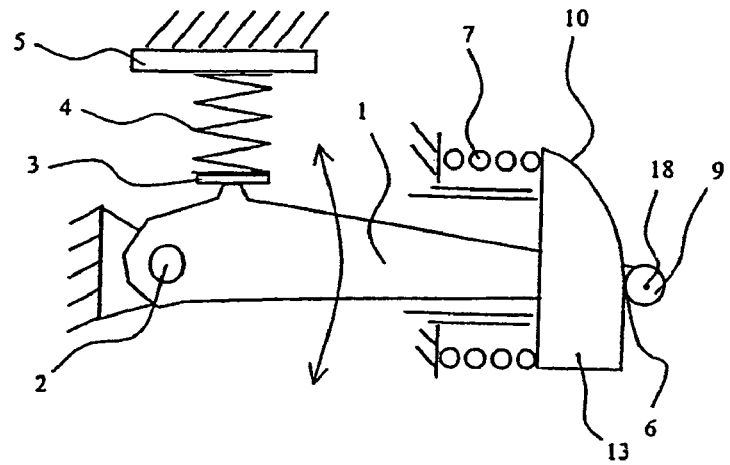

In the embodiment illustrated in FIG. 7, power-transfer member (13) is also disposed between power generator (7) and power point (18), except that the force-delivery direction of power generator (7) is opposite to that of FIG. 6. Contour (10) is also disposed on the side of power-transfer member (13) allocated to power point (18). This embodiment permits particularly compact construction of the force-applying device.

Figure 8:
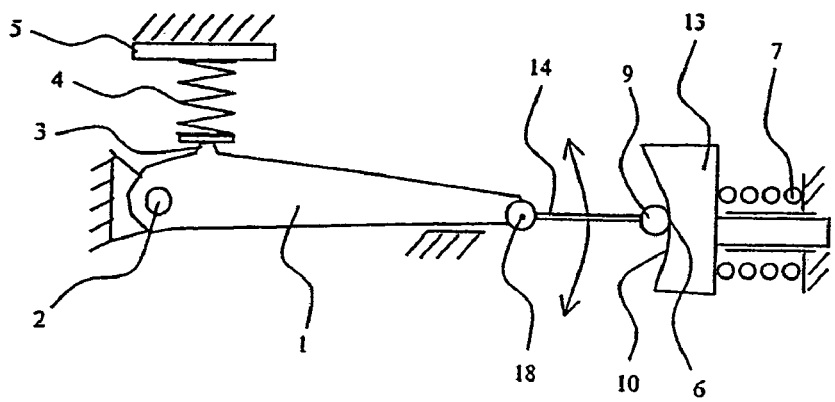

In the embodiment according to FIG. 8, a power-transfer module (14) is disposed between power-transfer member (13) and power point (18). At its end adjacent to lever (1), power-transfer module (14) is connected pivotally to lever (1) at power point (18). At the end of power-transfer module (14) adjacent to power-transfer member (13), there is attached translation device (9), which again functions in such a way that it can be moved along contour (10).

Figure 9:
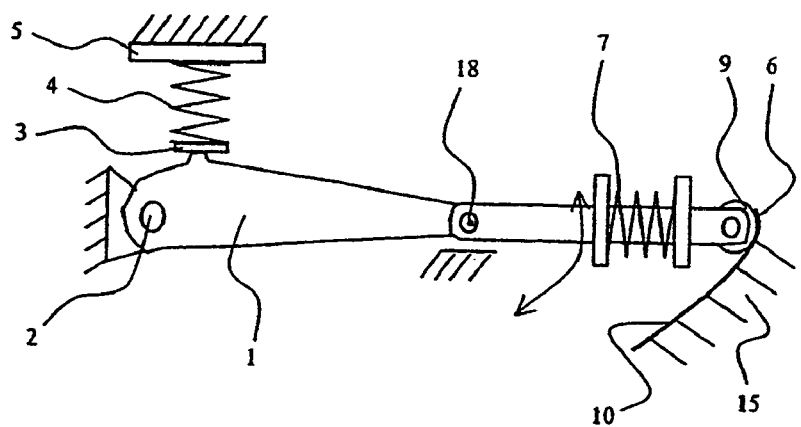
Figure 10:
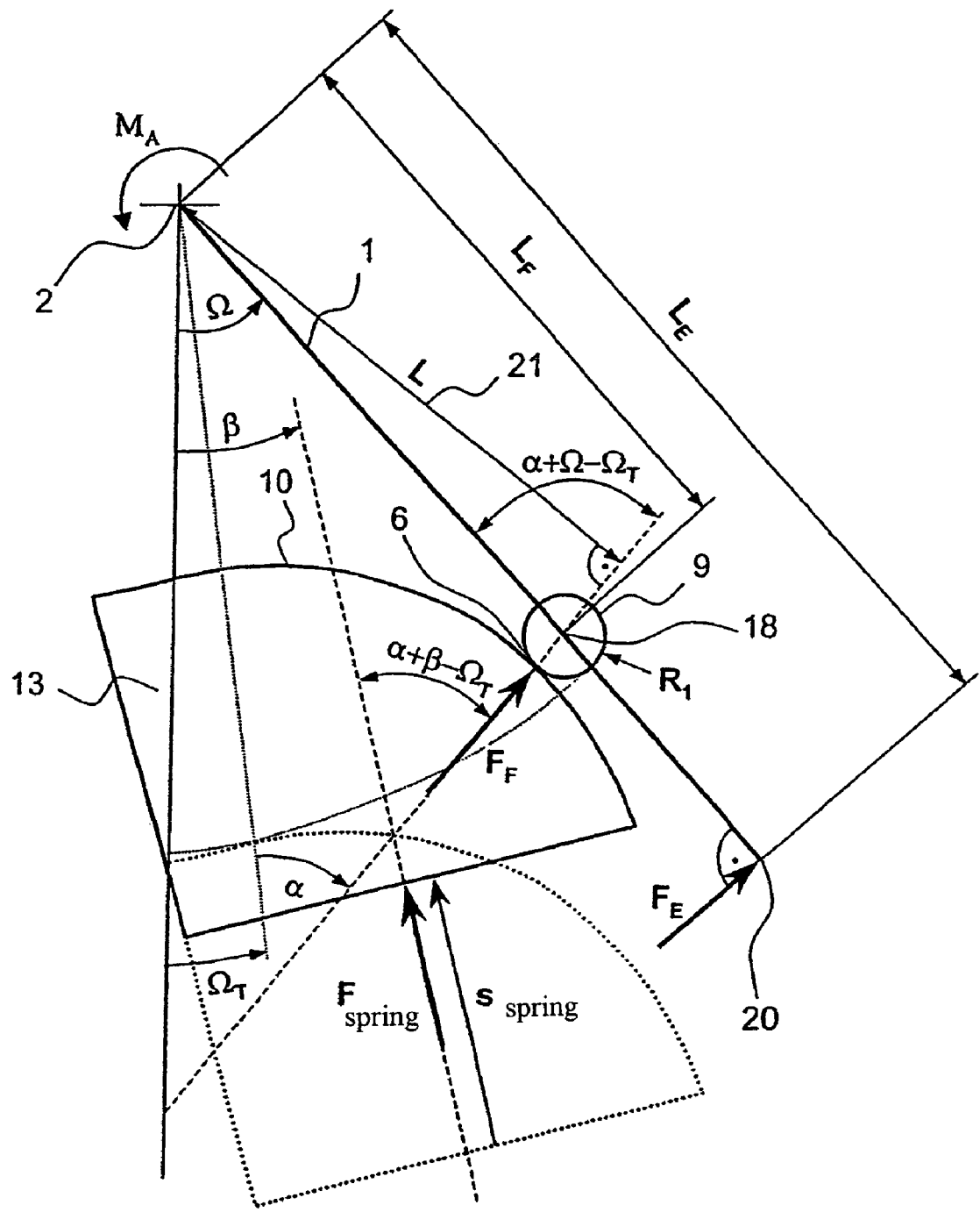

In a further embodiment according to FIG. 9, power generator (7) is disposed between power point (18) and a buttress (15) provided with contour (10) and disposed in fixed position. In this case, power generator (7) is pivotally connected at one of its ends to lever (1) at power point (18). At the other end of the power generator there is disposed translation device (9), which again functions in such a way that it can be moved along contour (10).

The main mode of action of the inventive force-applying device will be explained in more detail below on the basis of FIG. 10. For this purpose the embodiment according to FIG. 6 will be assumed. The explanations will also apply analogously for the embodiments of FIGS. 7 to 9 as well as for the configurations of the invention yet to be explained on the basis of the following figures.

Firstly, some mathematical variables must be defined for explanation of the main mode of action:

| | |
|---|---|
| $F_E$ | input force |
| $F_F$ | spring-force component acting on lever (1) |
| $F_{Spring}$ | total force of the spring |
| $S_{Spring}$ | displacement travel of power-transfer member (13) |
| $M_A$ | torque on lever (1) around fulcrum (2) |
| $\Omega$ | swiveling angle of lever (1) |
| $\Omega_T$ | dead-center angle |
| $\alpha$ | operating angle |
| $\beta$ | angular difference between force effect $F_{Spring}$ and the zero position of swiveling angle $\Omega$ |
| $L_F$ | lever-arm length from fulcrum (2) to power point (18) |
| $L_E$ | lever-arm length from fulcrum (2) to point of action of input force ($F_E$) |
| $L$ | length of virtual lever arm (21) |

On its side remote from fulcrum (2), power-transfer member (13) is urged with force ($F_{Spring}$) of power generator (7). In the following, the direction of action of force ($F_{Spring}$) will be assumed to have a difference by angle ($\beta$) relative to a parallel to the longitudinal axis of lever (1) at angular position Ω=0. The parallels may also coincide with one another.

Starting from an assumed angular position $Ω=Ω_T$, in which contour (10) runs perpendicular to the line of action of force ($F_{Spring}$), no force influence exerting a torque around fulcrum (2) is exerted by power generator (7) on lever (1). This position is also referred to as the dead-center position of lever (1). This setting is indicated in FIG. 10 by the dotted outline of power-transfer member (13).

During swiveling of lever (1) from the value $Ω=Ω_T$ to larger values, translation device (9) moves along contour (10), and power-transfer point (6) accompanies translation device (9). Given the contour (10) illustrated in FIG. 10, displacement of power-transfer member (13) also takes place toward fulcrum (2) by the travel segment ($S_{Spring}$), parallel to the direction of action of force ($F_{Spring}$) of power generator (7). Power-transfer member (13) then assumes the position illustrated with solid lines. The path of movement of translation device (9) during swiveling of lever (1) is indicated in FIG. 10 by the dashed line ending at translation device (9).

During this swiveling of lever (1), power generator (7) relaxes, and so force ($F_{Spring}$) decreases with increasing lever angle (Ω). Swiveling of lever (1) by an angle (Ω) also leads to an increase in operating angle (a), which at a lever angle of $Ω=Ω_T$ is defined as α=0. At operating angle (α), a force component ($F_F$) of the force ($F_{Spring}$) of power generator (7) is transferred to lever (1).

As is also evident from FIG. 10, a virtual lever arm (21) of length (L) is established in the illustrated lever position. Virtual lever arm (21) is imagined as perpendicular to the operating direction of force component ($F_F$) delivered by power generator (7) to lever (1). Thus the length (L) of virtual lever arm (21) represents the effective lever-arm length for determination of the torque contributed by force component (FF) around fulcrum (2). Thus an angle of $90°-α-Ω+Ω_T$ is formed between lever (1) and virtual lever arm (21). The length (L) of virtual lever arm (21) is calculated as follows:

$$L = L_F \cdot \sin(α+Ω-Ω_T) \quad [1]$$

For control of the swiveling of lever (1), input force ($F_E$) acts at a point of force action (20). The usable output torque ($M_A$) generated on the whole by lever (1) is therefore composed of the torque generated by input force ($F_E$) and of the torque generated by force component ($F_F$) of power generator (7), and can be calculated as follows:

$$M_A = F_{Spring} \cdot L_F \cdot F_E \cdot L_E \quad [2]$$

Angle (α) depends on the respective selected contour (10) as well as on lever angle (Ω), and so is a function of Ω.

$$α = f_{Contour}(Ω) \quad [3]$$

If the contour or function $f_{Contour}$ is known and forces $F_E$ and $F_{Spring}$ are given, output torque ($M_A$) can therefore be determined from the variable lever angle (Ω).

If lever (1) is swiveled from the value $Ω=Ω_T$ to smaller values, no torque is exerted by power generator (7) on lever (1) in the case of the contour illustrated in FIG. 10. This is a consequence of the arcuate form of contour (10). The shape of the arc corresponds substantially to the path of movement—illustrated by a dotted curve—of translation device (9) at $Ω<Ω_T$.

Figure 11:
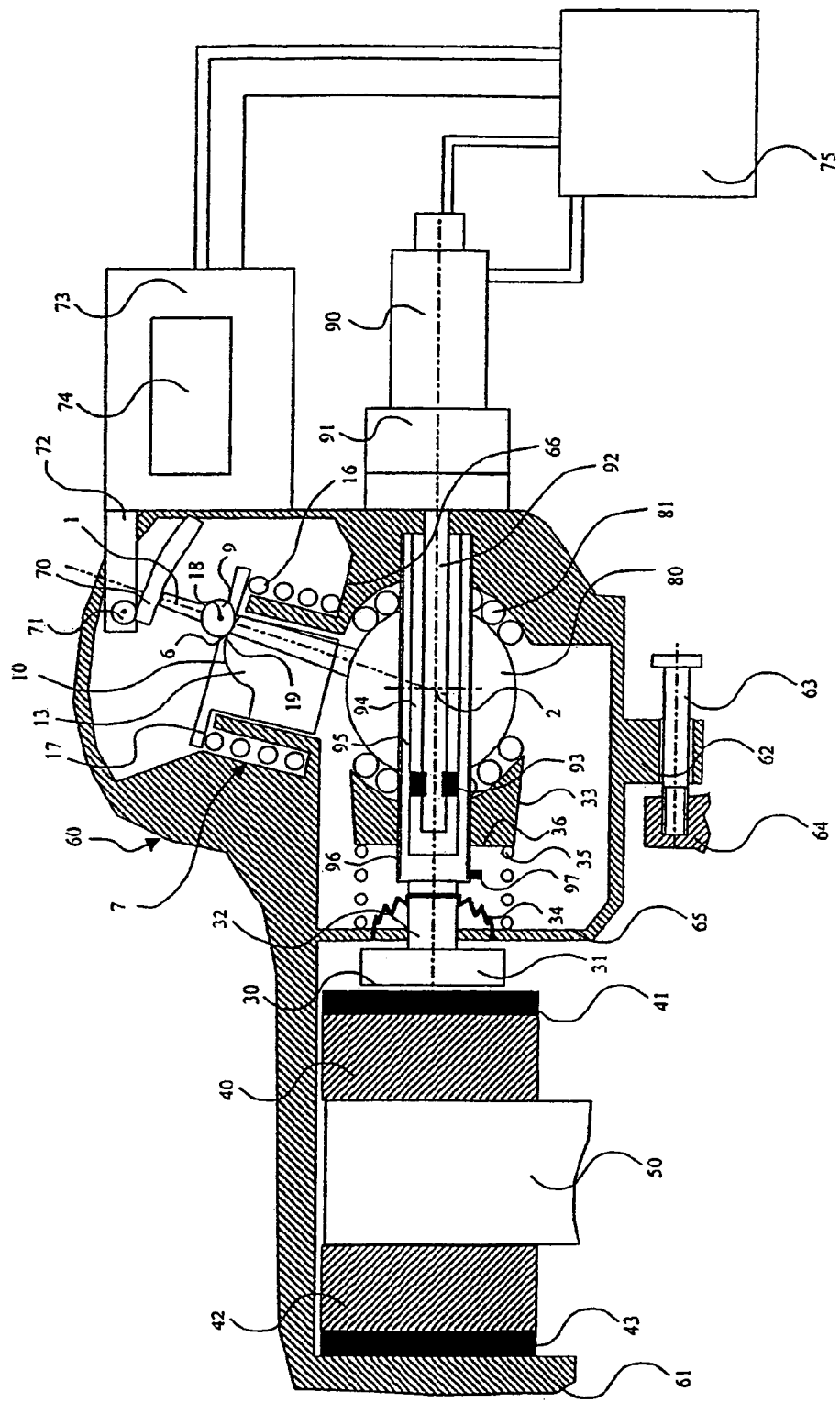
Figure 12:
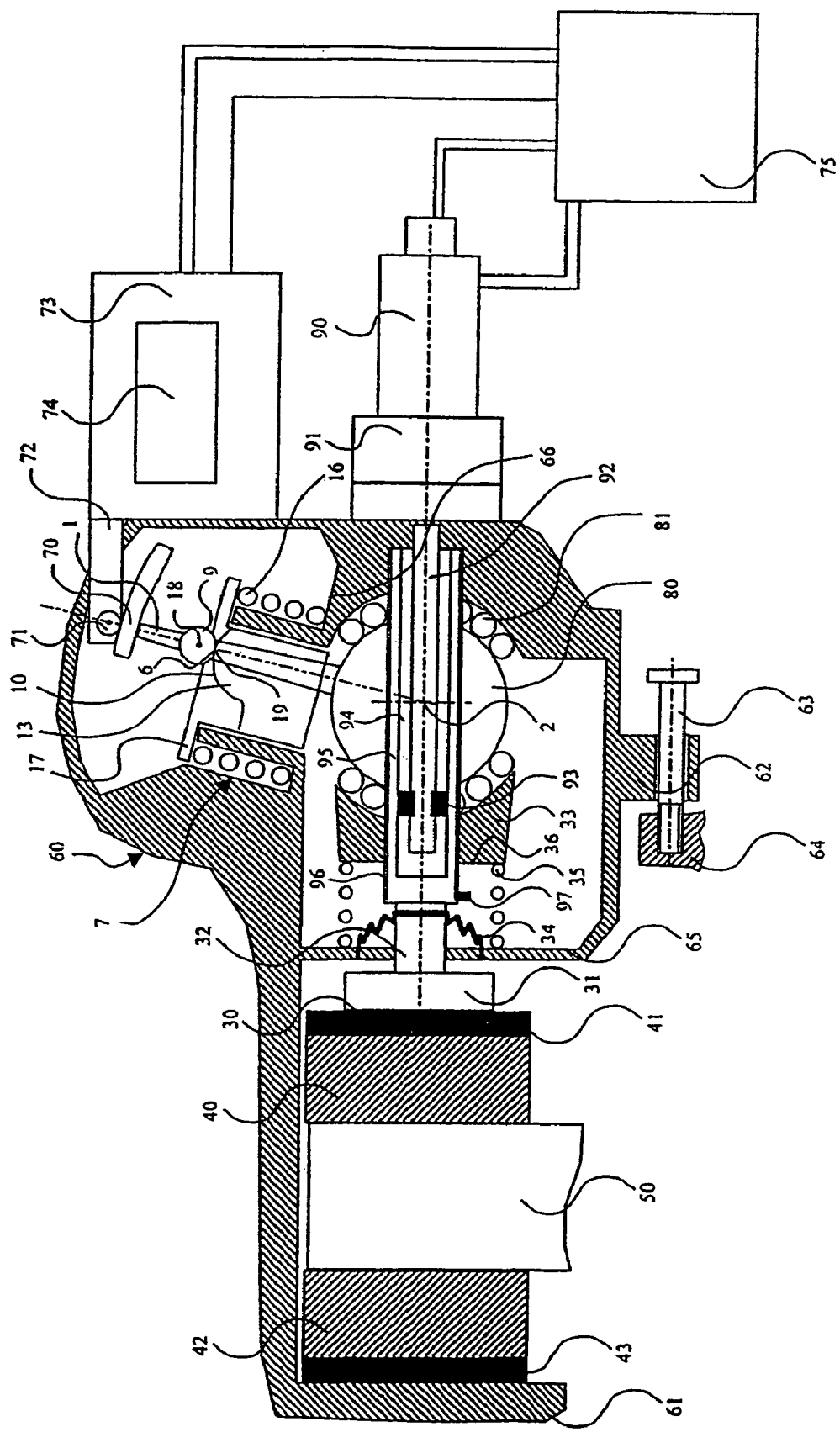
Figure 13:
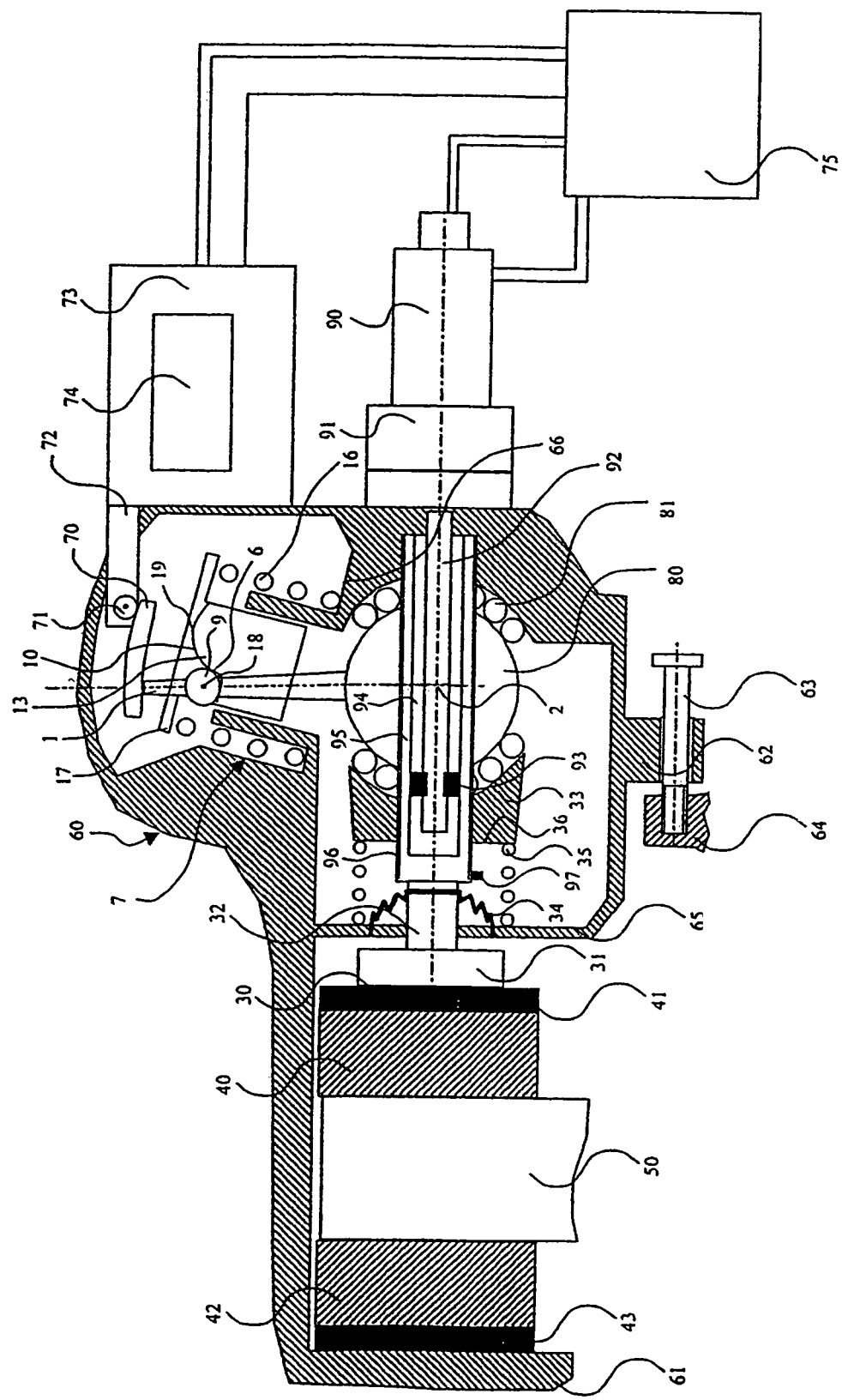

A further advantageous embodiment, in which variation of the output force is undertaken via a change of angle as explained hereinabove on the basis of FIGS. 6 to 10, will now be explained in more detail on the basis of FIGS. 11 to 13. The embodiment illustrated in FIGS. 11 to 13 is the same in each case, but the brake-application settings are different. Furthermore, a specific use as the force-applying device for a wheel brake on vehicles will be explained in more detail on the basis of FIGS. 11 to 13. The different brake-application settings respectively represent driving setting (no force applied), partial braking and full braking.

The brake actuator for a vehicle brake illustrated in driving setting in FIG. 11 is provided with a force-applying device according to the principle explained on the basis of FIGS. 6 to 10. Besides the already explained parts (1, 2, 6, 7, 9, 10, 13, 18), the force-applying device is provided with a toothed-ring sector (70)—resembling a curved toothed rack—disposed on lever (1) at the end remote from fulcrum (2). Toothed ring sector (70) engages with a toothed gear (71), which is disposed on device (72, 73, 74) for converting the input variable to force. During rotation, toothed gear (71) causes swiveling of lever (1), or in other words a change of angular position (Ω) of lever (1).

Via a kinematic chain (72), toothed gear (71) is in active communication with a drive unit (73), which is provided with a drive motor (74) preferably designed as an electric motor. Depending on embodiment, drive unit (73) may contain further components, such as electrical solid-state elements for activation of electric motor (74), or it may contain electrical resistors, for example for sensing the current drawn by electric motor (74). In an advantageous embodiment of the invention, drive unit (73) is also provided with a position-sensing device, such as an infrared photocell, for the rotary position of the takeoff shaft of the electric motor. Via conductors, drive unit (73) is connected to an electronic control unit (75) for exchange of data and information as well as to the power supply.

In an advantageous improvement of the invention, electric motor (74) is designed as a stepping motor, which can have the form, for example, of a switched reluctance motor. In this case there is no need for the position-sensing device, since the rotary position of the takeoff shaft is known to control unit (75) via the stepwise activation of electric motor (74).

In the embodiment according to FIGS. 11 to 16, force-receiving device (4, 5) of the devices illustrated in FIGS. 1 to 9 is designed as a brake disk (50) plus two brake linings (40, 41, 42, 43) disposed on both sides of brake disk (50) and respectively comprising a wearing surface (40, 42) and a backing plate (41, 43). The wearing surface (40, 42) in particular is endowed with a certain elasticity, whereas brake disk (50) and backing plates (41, 43) have comparatively less elasticity.

The transmission of force into brake disk (50) via brake linings (40, 41, 42, 43) takes place via ram (31), which exerts, on brake lining (40, 41) facing it, output force ($F_A$) of the force-applying device over an area of a contact face (30). Brake lining (42, 43) disposed on the opposite side of brake disk (50) is braced in opposition to output force ($F_A$) on a housing part (61) joined to housing (60) of the force-applying device.

In the force-application condition illustrated in FIG. 11, contact face (30) is disposed at a certain predesignated distance from backing plate (41) of brake lining (40, 41). This distance is also referred to as the clearance. In practice, the clearance is ideally adjusted equally on both sides of brake disk (50). To simplify the explanation, all clearance distances will be illustrated as a single resultant clearance between ram (31) and backing plate (41) in the following descriptions.

Via a rod (32) passing through an opening of wall (65) of housing (60), ram (31) is connected to a clearance-adjusting device (90, 91, 92, 93, 94, 95, 96, 97), which at its outside is connected pivotally via a thread (96) to a thrust piece (33). Thrust piece (33) functions to transfer output force ($F_A$) to ram (31).

At its end located in the region of fulcrum (2), lever (1) is connected to an output-force generating device (80), which upon a change of angular position ($\Omega$) of lever (1) causes a certain travel change of thrust piece (33) and thus also of ram (31). During an increase of angle ($\Omega$) from the zero position illustrated in FIG. 11, there takes place, for example, a movement of ram (31) toward backing plate (41). As a result, the clearance first shrinks, until ram (31) comes into contact with backing plate (41). Upon further increase of angle ($\Omega$), a braking force is generated.

Output-force generating device (80) can be designed, for example, as a cam. In a particularly advantageous embodiment, there is provided between device (80) and thrust piece (33) an involute contour, by means of which a substantially linear dependence can be achieved between the distance by which thrust piece (33) has moved and angle ($\Omega$). Hereby there is achieved a particularly simple analytical correlation, which has the advantage that algorithms for braking-force control executed in control unit (75) can be kept simple. Furthermore, less wear takes place than in different types of constructions.

Output-force generating device (80) is mounted in low-friction bearings such as a ball bearing or roller bearing (81) between thrust piece (33) and a part of housing (60).

In the embodiment of FIGS. 11 to 13, power generator (7) is provided with a preloaded spring (16), which at one end is braced in housing (60) on a contact face (66) integral with the housing. The other end of spring (16) presses against a retaining plate (17), which is joined integrally to power-transfer member (13). Power-transfer member (13) in turn has the already mentioned contour (10), via which the preload force of spring (16) operates via translation device (9) on the lever at power point (18).

As is also evident from FIG. 11, contour (10) has an apex (19), which will also be referred to hereinafter as dead center. Starting from the zero position of angle ($\Omega$), this dead center (19) will be reached at a certain dead-center angle ($\Omega_T$). At angular positions smaller than dead-center angle ($\Omega_T$), lever (1) is automatically reset to zero position ($\Omega=0$) whenever force ($F_E$) exerted by device (72, 73, 74) for converting the input variable to force via toothed gear (71) on lever (1) is canceled or fails. This reset process is initiated by power generator (7).

When dead-center angle ($\Omega_T$) is exceeded, an increasing, assisting force effect of power generator (7) in brake-application direction develops as a result of contour (10), which drops off gently at first and then more sharply according to a predetermined function. Because of the assisting force influence, the energy demand of device (72, 73, 74) for converting the input variable to force can be kept relatively small. By appropriate design of contour (10), it is also possible to bring about reset of the force-applying device to zero position by exploiting the elastic energy stored in force-receiving device (4, 5) or in brake (40, 41, 42, 43, 50), so that a self-releasing brake characteristic can be achieved in the entire brake-application range.

A seal (34) surrounding rod (32) protects the interior of housing (60) from dirt and also prevents lubricants from escaping from housing (60). To reset ram (31) in the region of the clearance in which restoring force can no longer be applied by force-receiving device (4, 5) or by brake (40, 41, 42, 43, 50), a restoring spring (35) braced between a wall (65) of housing (60) and thrust piece (33) brings about reset of ram (31) to a position predetermined by means of lever (1).

Via a bolt (63), housing (60) is joined to a fastening point (64) by means of a flange (62) integral with the housing. Fastening point (64) is part of a brake carrier of known design, which will not be discussed in further detail here. The brake carrier is joined to a vehicle axle to be braked in such a way that it is integral with the axle. The illustrated type of fastening is indicated in highly simplified form. In practice, it would be possible, for example, to use a pin guide containing, for example, two pins.

Clearance-adjusting device (90, 91, 92, 93, 94, 95, 96, 97), which is disposed spatially next to output-force generating device (80) in housing (60), is provided with a positioning motor (90) designed as an electric motor, which is connected via conductors to control unit (75). Via suitable activating signals from control unit (75), positioning motor (90) can be adjusted by a well-defined angle in one direction or the other.

Positioning motor (90) is connected via a kinematic chain (91) to an adjusting mechanism (92, 93, 94, 95, 96, 97). Kinematic chain (91) brings about a decrease of the rpm of the positioning motor while simultaneously increasing the torque. An adjustment-angle measuring device, whose signals are transmitted via the conductors to control unit (75), is disposed in kinematic chain (91) on the output side. By means of the signals of the adjustment-angle measuring device, control unit (75), knowing the pitch of thread (96), can at any time measure the adjustment travel of adjusting spindle (95) and thus the adjusted clearance by suitable algorithms. In practice, it may also be advantageous to use, as the adjustment-angle measuring device, a sensor such as an encoder, which is present in any case in the positioning motor (90). In electronically commutated motors, the use of a resolver or commuting sensor is also advantageous. Hereby there is no need for a separate sensor for measuring the adjustment angle.

On the output side of kinematic chain (91) there is provided a spline shaft (92), which is engaged via splines (93) with an adjusting spindle (95). These splines (93) are joined integrally to spline shaft (92) and run in a groove (94) disposed inside adjusting spindle (95). Via splines (93) and groove (94), a rotational movement of spline shaft (92), initiated by positioning motor (90), can be transmitted to adjusting spindle (95), which, by virtue of a thread (96) disposed on its outside and in turn engaged with a female thread disposed on thrust piece (33), brings about a longitudinal displacement of adjusting spindle (95) relative to spline shaft (92). In the process, splines (93) slide along in groove (94).

By virtue of the longitudinal displacement of adjusting spindle (95), a decrease or increase of the clearance takes place via the parts (31, 32) joined integrally to adjusting spindle (95). Via a stop stub (97) joined integrally to adjusting spindle (95), the reset movement of adjusting spindle (95) during an increase of the clearance is mechanically limited, to the effect that adjusting spindle (95) can be screwed in only to the point that stop stub (97) comes into contact against a contact face (36) of thrust piece (33).

At the setting ($\Omega=\Omega_T$) of lever (1) illustrated in FIG. 12, power-transfer point (6) just reaches the dead center of contour (10). In this condition, power generator (7) does not provide any suitable force assistance for adjustment of lever (1) in one direction or the other. According to an advantageous configuration of the invention relating to this setting, ram (31) is already in contact with backing plate (41) of brake lining (40, 41). In other words, the clearance is always closed up at this setting. The clamping force necessary up to this setting is completely applied by electric motor (74) after the clearance has been closed up.

In the position of lever (1) illustrated in FIG. 13, the maximum deflection is illustrated. Thus the brake is being urged with the maximum clamping force. Power-transfer point (6) is now located in a portion of contour (10) that brings about an assisting action of power generator (7). Further adjustment of lever (1) would bring power-transfer point (6) into a flattened contour portion, where power generator (7), by analogy with the dead-center position, would no longer provide any assisting force. In this case, lever (1) would be moved back by virtue of the restoring force of the elastically preloaded brake (40, 41, 42, 43, 50), and so a stable working point at maximum brake application is achieved by the illustrated contour.

Figure 14:
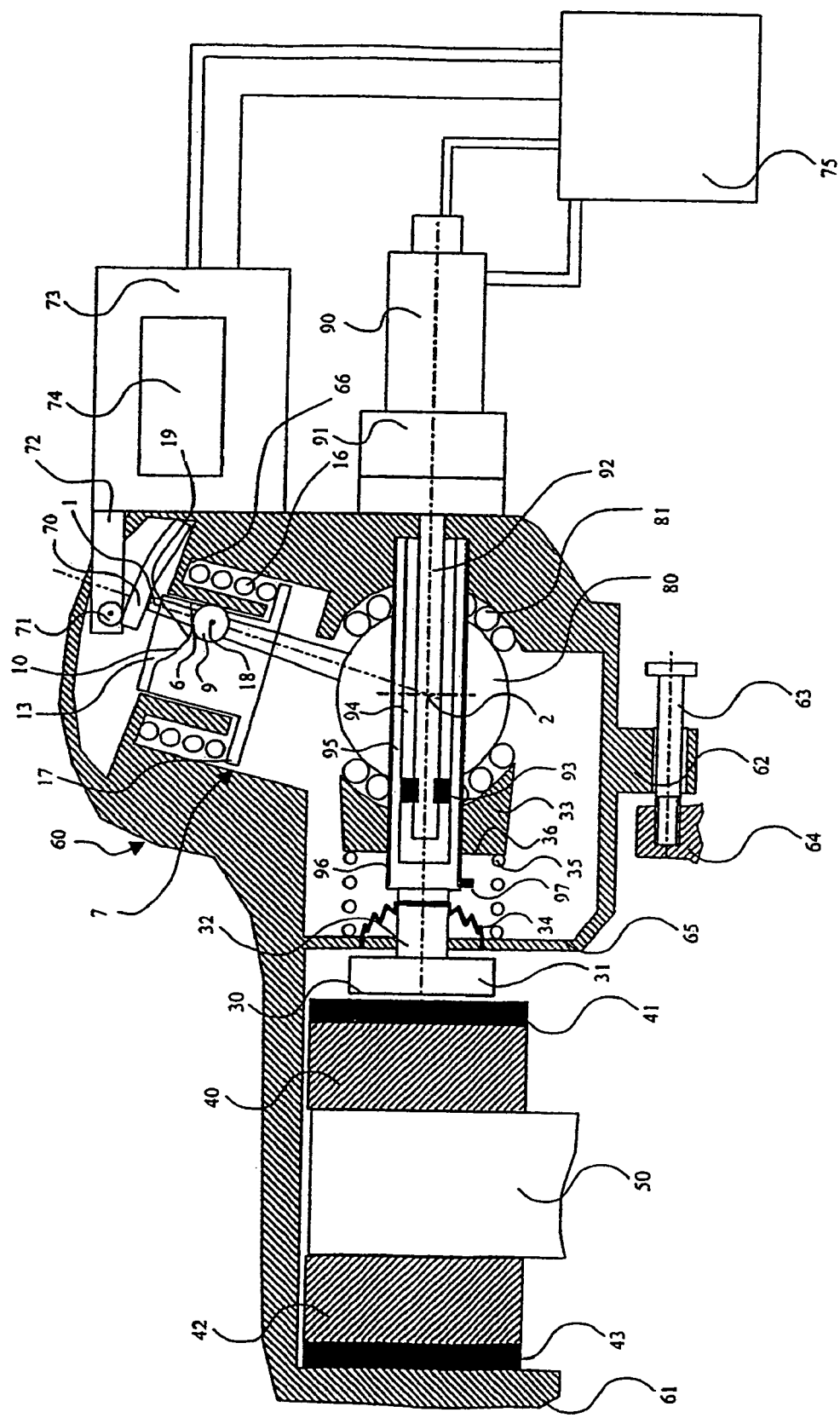
Figure 15:
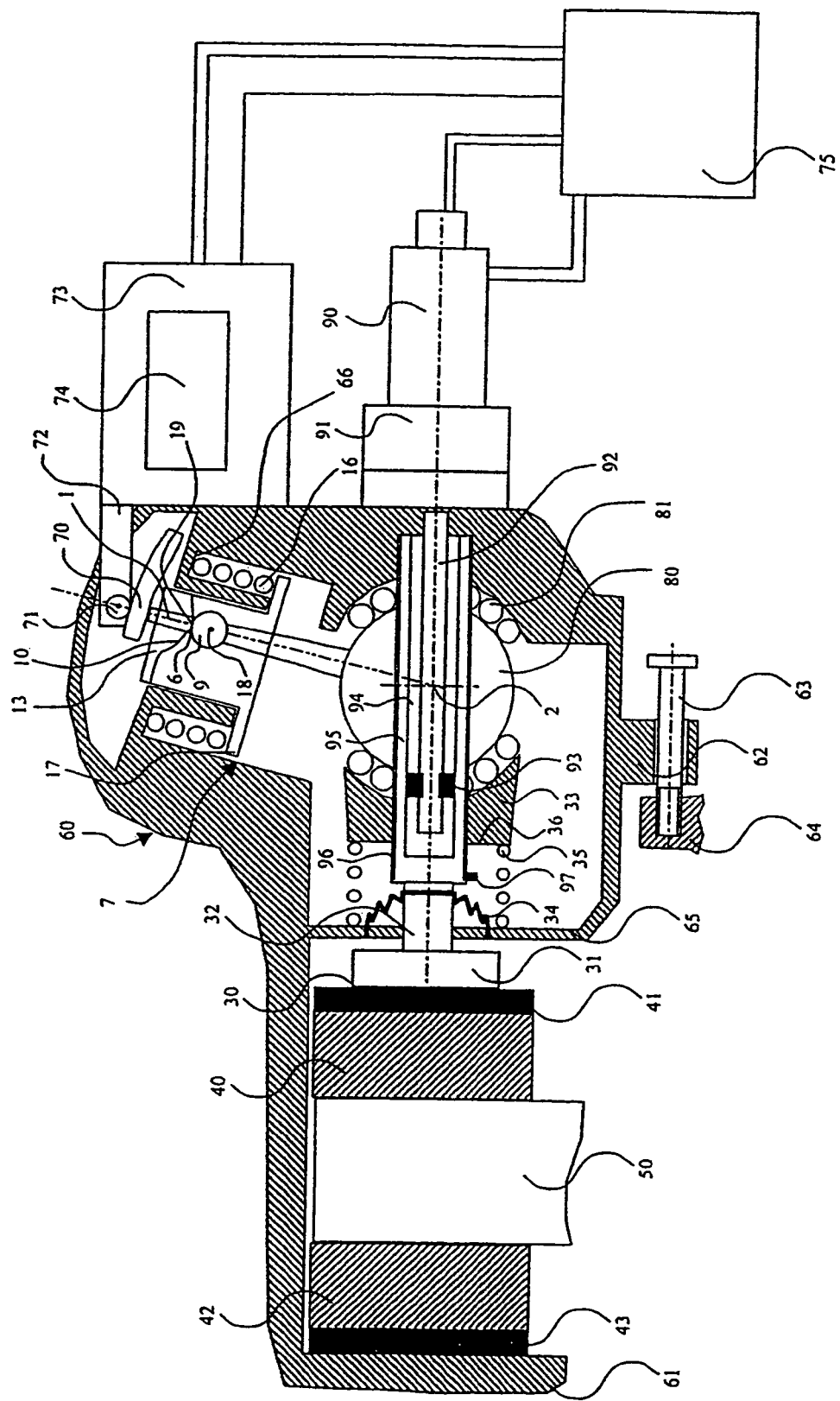
Figure 16:
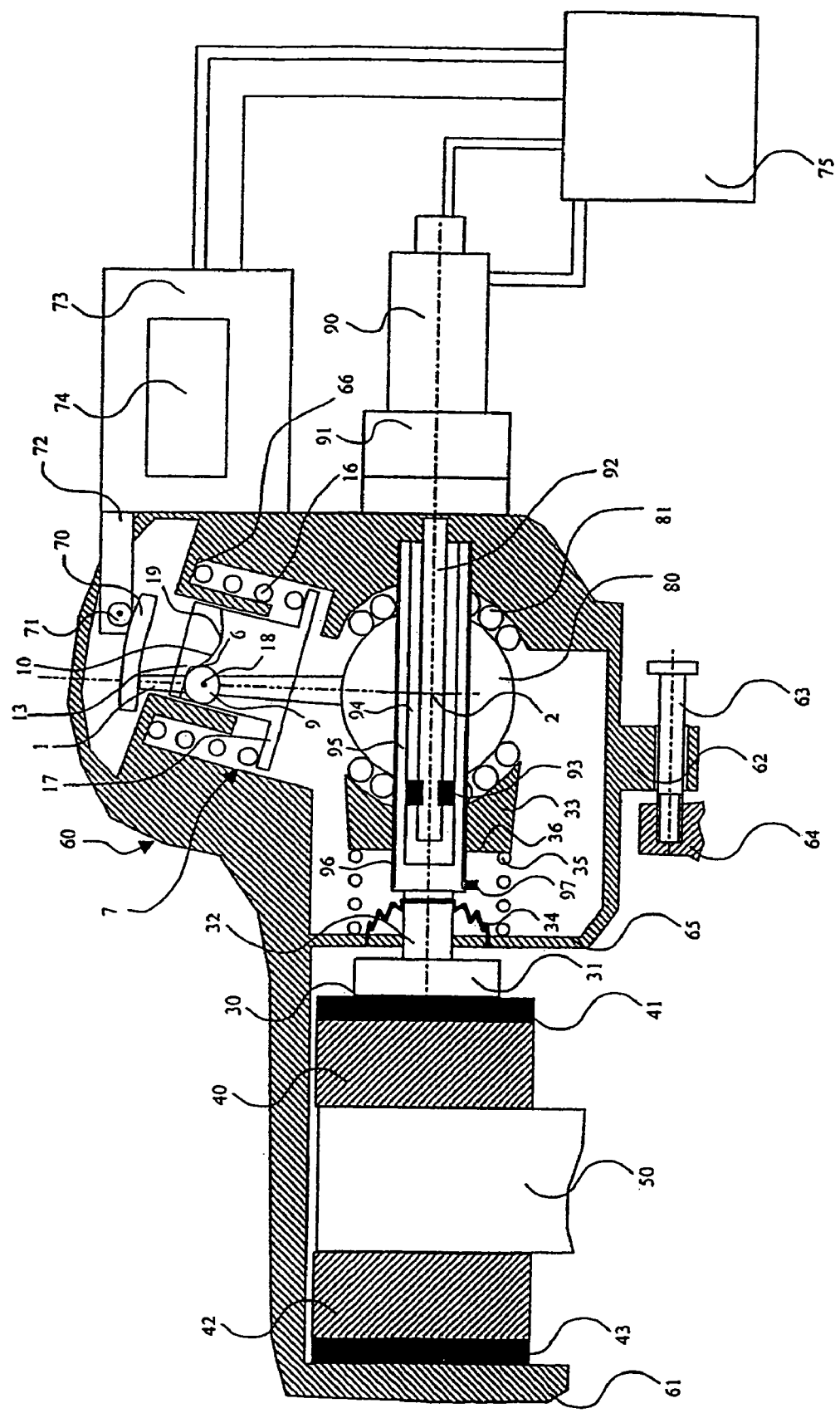

In contrast to the force-applying device described in FIGS. 11 to 13, the embodiment of the force-applying device illustrated in various brake-application settings in FIGS. 14 to 16 has a different arrangement of the power generator, wherein retaining plate (17) carrying power-transfer member (13) is pointing toward fulcrum (2). The functional principle corresponds to the embodiment illustrated in FIGS. 11 to 13, except that power generator (7) is disposed in mirror-image position. This type of the embodiment can also be designated as a force-applying device with free spring (16), whereas the embodiment according to FIGS. 11 to 13 can be designated as a force-applying device with captive spring (16).

In the inventive force-applying device, it is advantageous to design the construction in such a way that lever angle (i), upon reaching the clearance limit ($\Omega=\Omega_{LS}$), is also close to the dead-center angle ($\Omega_T$) Hereby the assisting influence of power generator (7) during the brake-application process begins when brake linings (40, 41, 42, 43) are urged with a braking force and thus there is developed an increasing demand for brake-application energy, which can then be largely covered by the energy supply stored in the power generator. For a self-releasing brake characteristic, however, a value smaller than the dead-center angle ($\Omega_T$) must always be chosen for the clearance limit ($\Omega=\Omega LS$).

Figure 17:
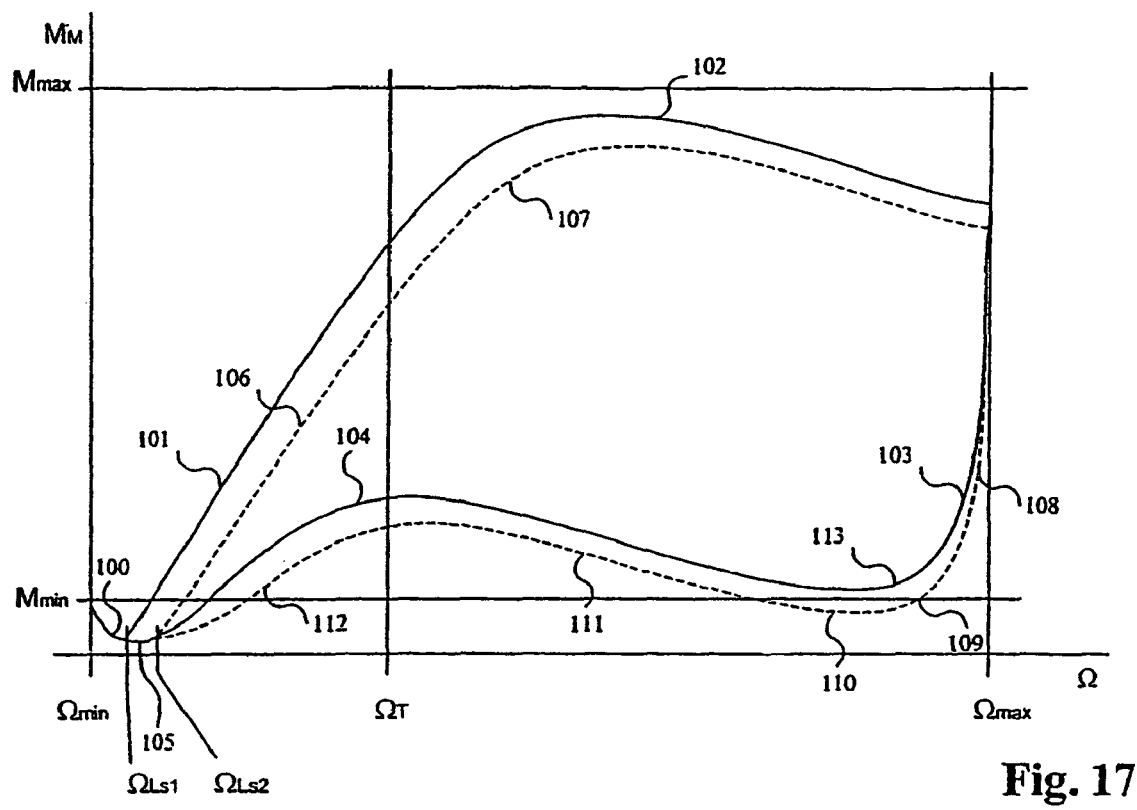

The curves of the torque ($M_M$) injected by electric motor (74) into the force-applying device during the brake-application process and during reset to driving setting respectively are illustrated in FIG. 17. Curve (101, 102, 103, 104, 105, 113) illustrated by solid lines is indicated for a first adjustment of the clearance ($\Omega_{LS1}$) by means of clearance-adjusting device (90, 91, 92, 93, 94, 95, 96, 97). Curve (106, 107, 108, 109, 110, 111, 112) illustrated by dashed lines is illustrated for a further value ($\Omega_{LS2}$) of the clearance, larger than that of the first curve.

Starting from driving setting ($\Omega=\Omega_{min}$) of lever (1), the lever is urged with an initial torque, whereupon it performs a movement in brake-application direction. In the process, or in other words until ram (31) reaches the point of contact with brake lining (40, 41) at $\Omega=\Omega_{LS1}$, the torque ($M_M$) delivered by electric motor (74) is relatively small. In this range, the region in which the contour flattens out up to its dead center must be traversed, while power generator (7) is already exerting a force opposing the torque delivered by the electric motor. This opposing force decreases with increasing angle ($\Omega$).

Starting from the initial value ($M_{min}$), motor torque ($M_M$) first decreases slightly according to curve segment (100). In curve segment (101) it then experiences a steep increase, which is continued seamlessly in curve segment (102), after dead-center angle ($\Omega_T$) has been reached and passed. Thereafter, because of increasing assisting action by power generator (7), it flattens out and decreases slightly, until the maximum brake-application angle ($\Omega_{max}$) corresponding to full braking is reached.

Beginning with curve segment (103), the brake is released again, or in other words is adjusted in the direction of driving setting. As is evident from curve segment (103) in FIG. 17, motor torque ($M_M$) must first pass through a hysteresis before lever (1) executes any appreciable extent of movement. In a subsequent curve segment (113), which has relatively flat shape and desirably is located in the range of small motor torques such as the initial value ($M_{min}$), reset of lever (1) then takes place. In the process, motor torque ($M_M$) increases again in the region of dead-center angle ($\Omega_T$), before seamlessly becoming smaller in curve segment (104) and returning via curve segments (105, 100) to the initial value ($M_{min}$) once again.

The increase of motor torque ($M_M$) in the region of the dead-center angle ($\Omega_T$) is caused by brake hysteresis, which becomes steadily smaller starting from the maximum brake-application position. As a result, the resetting force influence of preloaded brakes can develop more easily. In order to maintain a specified brake-application angle ($\Omega$), therefore, an increased motor torque ($M_M$) is necessary in this region.

At a larger clearance ($\Omega_{LS2}$), the steep increase—represented by curve segment (106)—of motor torque ($M_M$) that begins after curve segments (100, 105) have been passed begins later than in the case described in the foregoing. Curve segments (101, 102) for smaller clearance on the one hand and curve segments (106, 107) for larger clearance on the other hand run substantially parallel to one another, in such a way that the motor torques ($M_M$) to be applied by the motor in the case of larger clearance are smaller at the same lever angle ($\Omega$).

In reset branch (108, 109, 110, 111, 112) also, the motor torques ($M_M$) are smaller than in the case of smaller clearance. As is also evident from FIG. 17, motor torque ($M_M$) drops below the desired minimum value ($M_{min}$) of motor torque ($M_M$) at point (109) and also remains below it in curve segment (110).

Passage of motor torque ($M_M$) into the region of negative values is not desired, since then a self-applying brake characteristic would be developed. The curves illustrated in FIG. 17 represent a self-releasing brake characteristic, such as is desired in practice. In certain ranges the brake characteristic can be influenced by the choice of clearance and adapted to a desired curve.

Figure 18:
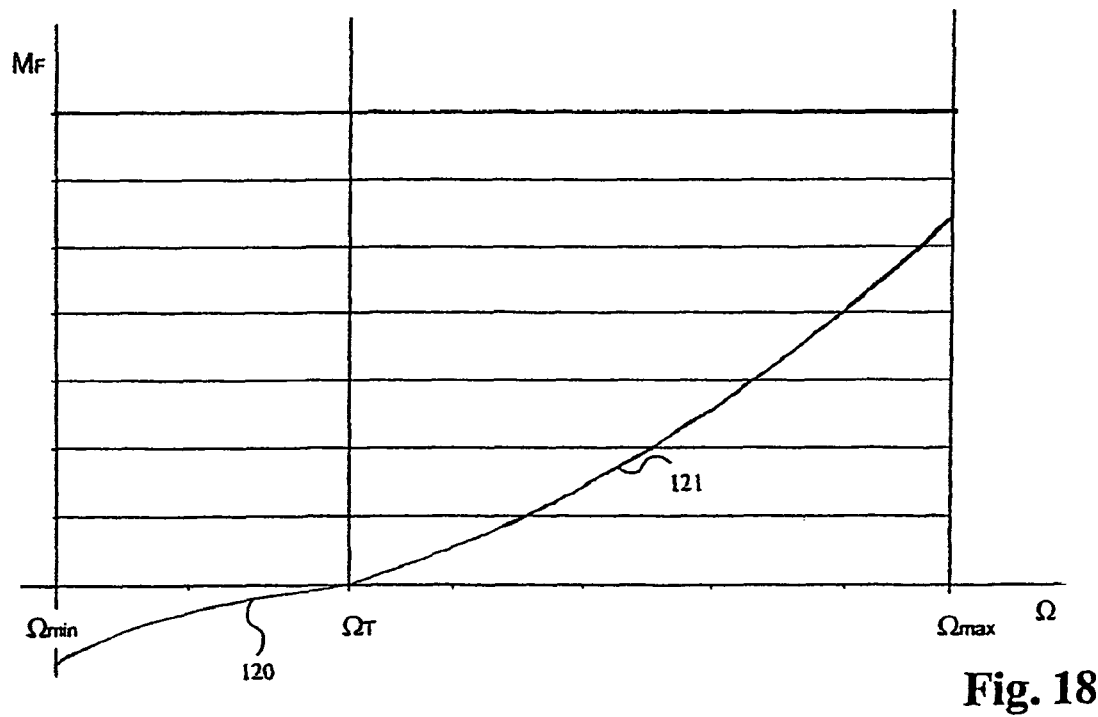

In FIG. 18 there is illustrated the assisting torque component ($M_F$) exerted on brake lever (1) by power generator (7) or its spring (16). The motor torque ($M_M$) already described on the basis of FIG. 17, combined with the torque ($M_F$) exerted by the power generator, represents the total output torque ($M_A$) of the force-applying device that operates on lever (1) and can be delivered to the brake.

In a region (120) in which the dead center has not yet been passed, torque ($M_F$) has negative values, resulting in an influence causing reset of lever (1) toward the zero position ($\Omega=0$). In this region, power generator (7) works in opposition to motor torque ($M_M$), with the consequence that electric motor (74) must provide a certain torque in order to move lever (1) in brake-application direction even in the clearance region. When dead-center angle ($\Omega_T$) is reached, the assisting force or torque influence of power generator (7) according to curve (121) then begins, and so the load on electric motor (74) is reduced during brake application.

Curve (121) represents a desired index function, which can be ascertained on the basis of typical brake designs. For this purpose it is conceivable, for example, to evaluate a large number of individual brakes experimentally with regard to their brake-application characteristics, or in other words the torque demand for brake application, measured versus the lever angle ($\Omega$). It is advantageous then to determine the index function as a compensating function, which lies below all experimentally measured brake-application characteristics and is tangential thereto. The advantage in this case is that a self-releasing brake characteristic can be ensured, since the starting point at each lever setting ($\Omega$) is the smallest demand for brake-application torque of all tested brakes.

The index function is preferably determined by means, for example, of compensating calculation or interpolation. Curve (121) is directly related to contour (10). Contour (10) can be determined on the basis of curve (121), or in other words the index function, by means, for example, of a numerical iteration method.

Figure 19:
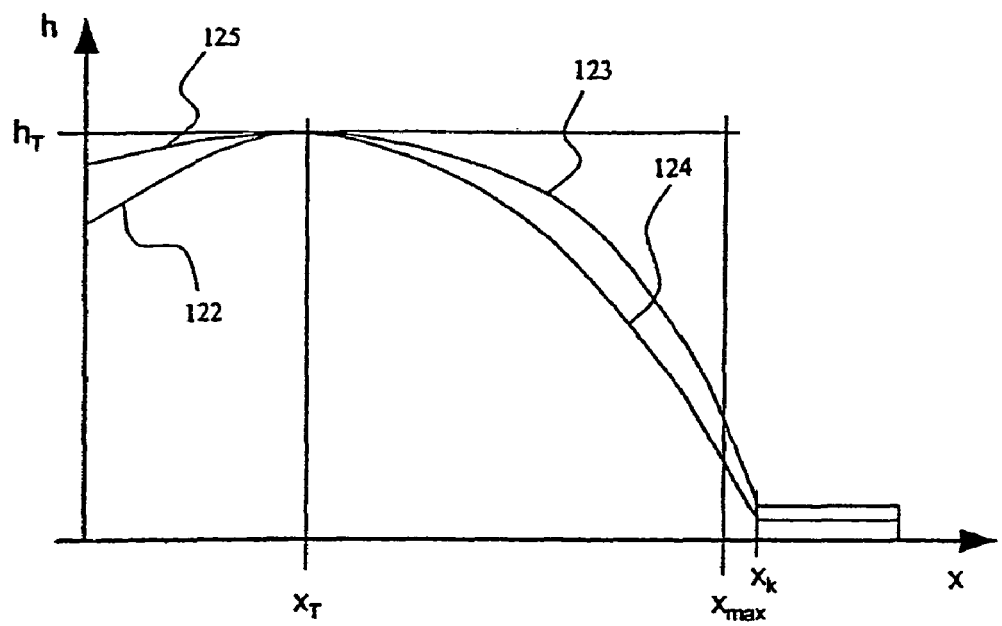
Figure 20:
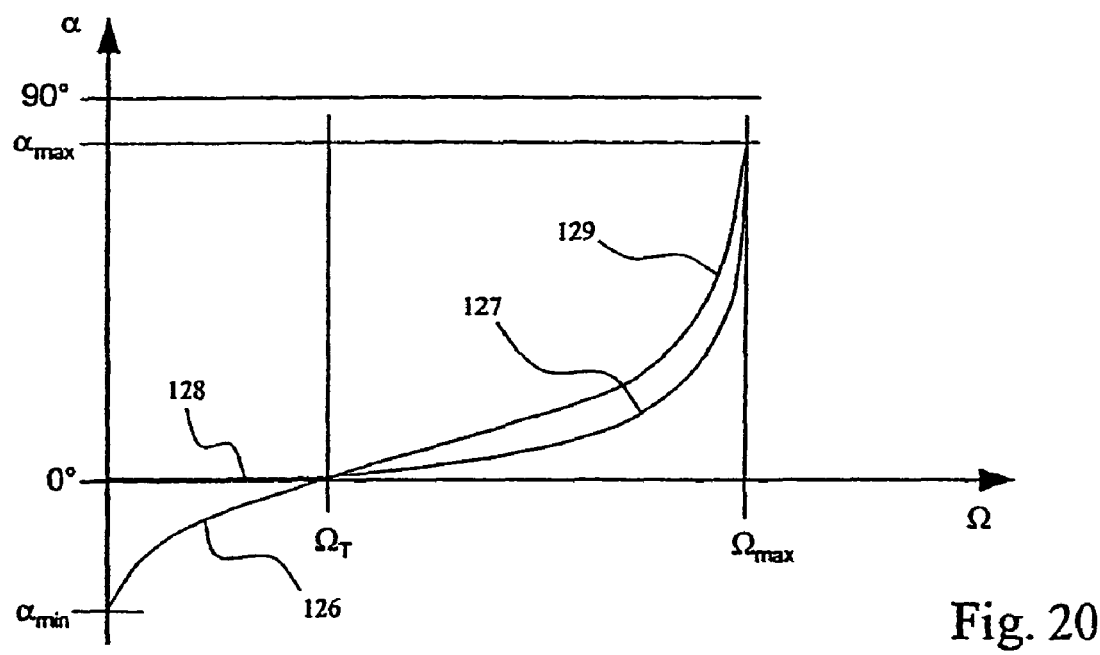

Preferred embodiments of contour (10) as well as of the associated function $f_{Contour}$ of operating angle ($\alpha$) as a function of lever angle ($\Omega$) are explained on the basis of FIGS. 19 and 20.

A preferred shape of contour (10), as already also indicated in FIGS. 11 to 13, is illustrated by curve segments (122, 123) in FIG. 19. The spatial shape of contour (10) with respect to the ordinate (h) begins from the start of the contour (x=0), ascends gently at first with a slight convex curvature and, from dead center ($x_T$) on, which is reached at lever angle ($\Omega_T$), merges into a region of greater convexity, which descends gently at first and then more steeply. At the value ($x_{max}$), the maximum value ($\Omega_{max}$) is then reached for adjustment of lever (1) in brake-application direction. From this setting on, no further adjustment of lever (1) is desired. Nevertheless, contour (10) is extended slightly further to the value ($x_k$), from which point on contour (10) becomes substantially straight. The extension of contour (10) is necessary by virtue of the dimensions of translation device (9), to ensure that this device does not encounter the straight region of the contour ($x > x_k$) before it reaches the angle ($\Omega_{max}$). By virtue of the straight region of the contour, there is also achieved a stable end point for adjustment of lever (1).

The contour composed of curve segments (122, 123) is preferably used in a force-applying device for brakes on commercial vehicles. As an alternative to curve segment (122), there can also be used a contour according to curve segment (125) in the range of $x < x_T$. All intermediate contours can also be advantageously used. As an example, curve segment (125) follows substantially a circular contour, which corresponds to the curved path of translation device (9) in this region. Hereby there is avoided a torque influence of power generator (7) on lever (1) in the range of $x < x_T$.

As an alternative to curve segment (123), there can be employed a contour according to curve segment (124) in the range of $x > x_T$. Compared with curve segment (123), curve segment (124) has a more steeply descending contour at first, for the purpose of reduced convexity on the whole. A contour according to curve segment (124) can be advantageously used in a force-applying device in which particularly fast application and also release of the brakes is desired in the range of light braking, such as partial braking, for example in passenger-car brake systems.

All contour shapes capable of being assembled from the curve segments (122, 123, 124, 125) illustrated in FIG. 19 can be advantageously employed by the person skilled in the art, who will select them to match the particular purpose.

In FIG. 20 there are shown the curve segments corresponding to the curve segments illustrated in FIG. 19 in the form ($\alpha = f_{Contour}(\Omega)$). Thus curve segment (126) correlates with curve segment (122), (127) with (123), (128) with (125) and (129) with (124).

From FIG. 20 it is evident on the one hand that lever angle ($\Omega$) is limited to the value ($\Omega_{max}$). At this value, an operating angle of $\alpha = \alpha_{max}$ is then established. In this case, curve segment (128) corresponds substantially to zero angle and thus runs along the abscissa.

It will be understood that any other types of actuators, including electrical, hydraulic and pneumatic types, may also be used instead of electric motors (74, 90).

Figure 21:
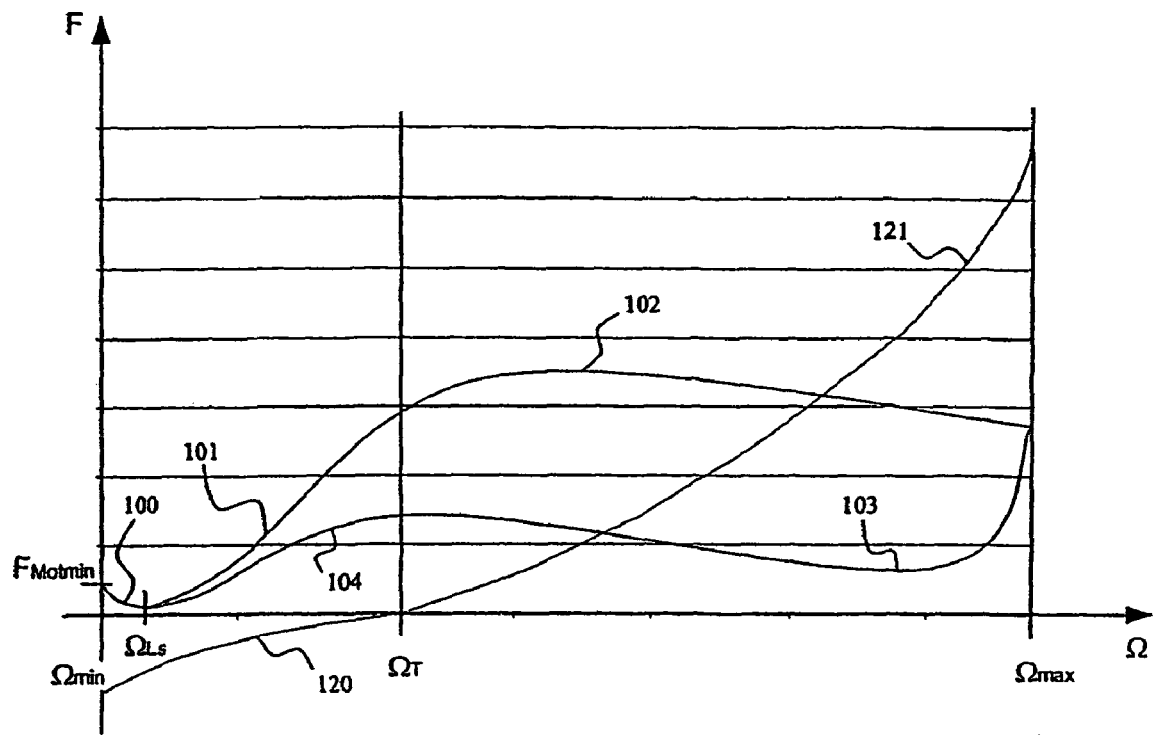

As an example, FIG. 21 shows the curve (100, 101, 102, 103, 104)—already explained on the basis of FIG. 17 in the representation as a torque ($M_M$)—representing the first clamping-force component ($F_{Mot}$) injected by electric motor (74) into the force-applying device. As another example, FIG. 21 shows the curve (120, 121)—already explained on the basis of FIG. 18 in the representation as a torque ($M_F$)—representing the assisting clamping-force component ($F_{Fe}$) delivered by power generator (7) versus lever angle ($\Omega$). In the diagram according to FIG. 21, the hysteresis occurring between application and release of the brake, resulting predominantly from the known brake hysteresis, is incorporated in the force curve (100, 101, 102, 103, 104) for the first clamping-force component ($F_{Mot}$). In other words, all other hysteresis components, such as that from the power generator, are incorporated in this one curve in order to simplify the diagram.

Starting from driving setting ($\Omega = \Omega_{min}$) of lever (1), this lever is urged with an initial force, whereupon it performs a movement in brake-application direction. In the process, or in other words until ram (31) reaches the point of contact with brake lining (40, 41) at $\Omega = \Omega_{LS}$, the first clamping-force component ($F_{Mot}$) is relatively small. In this range, the region in which the contour flattens out up to its dead center must be traversed, while power generator (7) is exerting a force ($F_{Fe}$) opposing the first clamping-force component ($F_{Mot}$) delivered by electric motor (74). This opposing force decreases with increasing angle ($\Omega$) according to curve segment (120).

Starting from the initial value ($F_{Motmin}$), the first clamping-force component ($F_{Mot}$) first decreases slightly according to curve segment (100). In curve segment (101) it then experiences a steep increase, which is continued seamlessly in curve segment (102), after dead-center angle ($\Omega_T$) has been reached and passed. Thereafter, because of increasing assisting action by power generator (7), it flattens out and decreases slightly, until the maximum brake-application angle ($\Omega_{max}$) corresponding to full braking is reached. In the angle region above the dead-center angle ($\Omega_T$), the assisting clamping-force component ($F_{Fe}$) of power generator (7) increases according to curve segment (121), the shape of curve segment (121) being chosen according to a desired design characteristic for the force-applying device. As already mentioned, the total clamping force is derived from the sum of the first clamping-force component and the assisting clamping-force component, which according to the diagram of FIG. 21 is possible by addition of the individual curve portions.

Beginning with curve segment (103), the brake is released again, or in other words it is adjusted in the direction of driving setting. As is evident from curve segment (103) in FIG. 21, the first clamping-force component ($F_{Mot}$) must first pass through a hysteresis before lever (1) executes an appreciable extent of movement. In a subsequent curve segment, which has relatively flat shape and desirably is located in the region of small electric motor forces such as the initial value ($F_{Motmin}$), reset of lever (1) then takes place. In the process, the first clamping-force component ($F_{Mot}$) increases again in the region of the dead-center angle ($\Omega_T$), before seamlessly becoming smaller in curve segment (104) and returning via curve segment (100) to the initial value ($F_{Motmin}$) once again.

Figure 22:
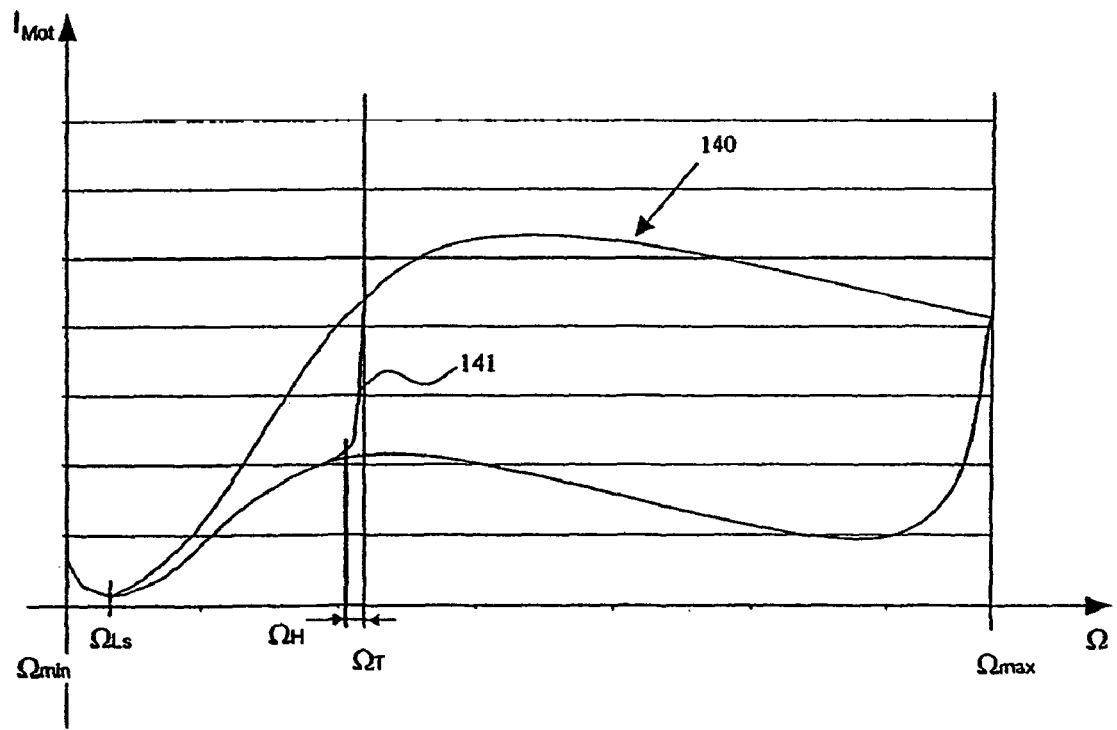

FIG. 22 shows the curve—analogous to the process of brake application and reset described on the basis of FIG. 21—of the current ($I_{Mot}$) drawn by electric motor (74) versus lever angle ($\Omega$). In this case, current ($I_{Mot}$) does not represent an instantaneous value, but is obtained from the recording of current versus time by suitable time averaging or filtering.

In this case, the type of filtering or conditioning of the current signal depends on the type of electric motor used. In a simple direct-current brush-type motor, complex filtering will usually not be necessary. Instead, the directly measured current value can essentially be used for implementation of the inventive method. In electric motors operated with alternating signals, such as three-phase motors, switched reluctance motors or other motors operating according to the stepping-motor principle, time averaging of the current signal and/or filtering will usually be necessary in order to obtain an informative value for the current drawn ($I_{Mot}$).

Current curve (140) illustrated in FIG. 22 corresponds approximately, over most of its path, to the curve of first clamping-force component ($F_{Mot}$). Thus, in the present practical example, it can be assumed approximately that the variables ($F_{Mot}$, $I_{Mot}$) are proportional. Thus the already explained hysteresis also exists for current curve (140).

Current curve (140) represents the variation of the current ($I_{Mot}$) during a complete brake-application movement and a subsequent brake-reset movement. Influences due to inertia have been disregarded here. During a relatively small brake-application movement, for example up to dead-center angle ($\Omega_T$), the curve of the current drawn ($I_{Mot}$) would correspond to curve (140) up to the value ($\Omega-\Omega_T$). At this point ($\Omega=\Omega_T$) of reversal of the brake-application movement, the hysteresis would then also be active, as illustrated by curve segment (141). Analogous curve portions or curve segments are obtained for every other adjustable value of lever angle ($\Omega$). As is also evident from FIG. 22, a decrease of the current ($I_{Mot}$) already leads to a slight change ($\Omega_H$) of lever angle ($\Omega$) in reset direction even in the hysteresis region. This change ($\Omega_H$), referred to hereinafter as brake-release swiveling angle, will be taken into account in the method described below.

A preferred configuration of the inventive method for adjustment of a clamping force will be explained on the basis of FIGS. 23 and 24. The method according to FIGS. 23 and 24 is repeated cyclically, for example at intervals of 10 milliseconds, in control device (75).

Figure 23:
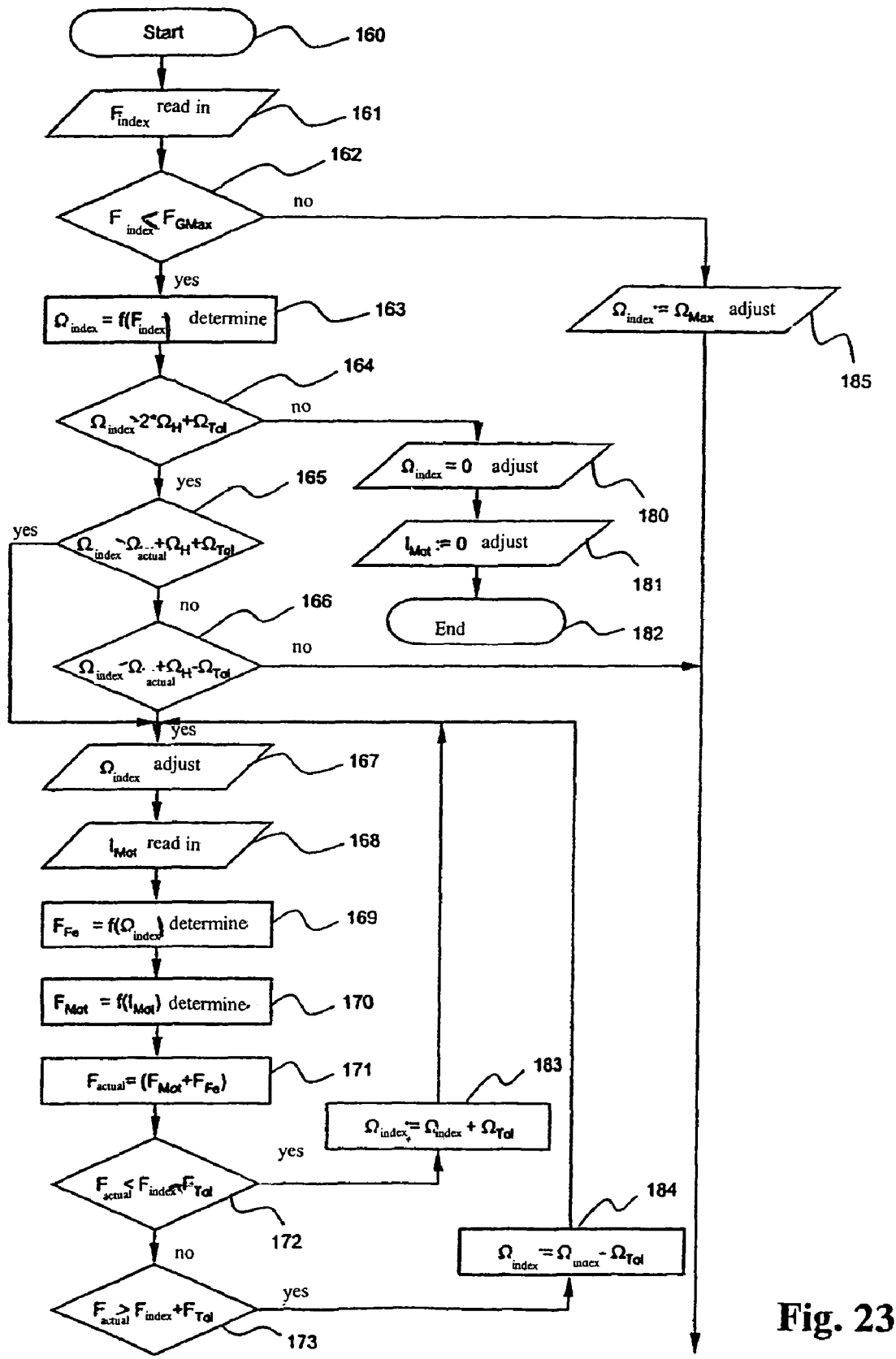
Figure 24:
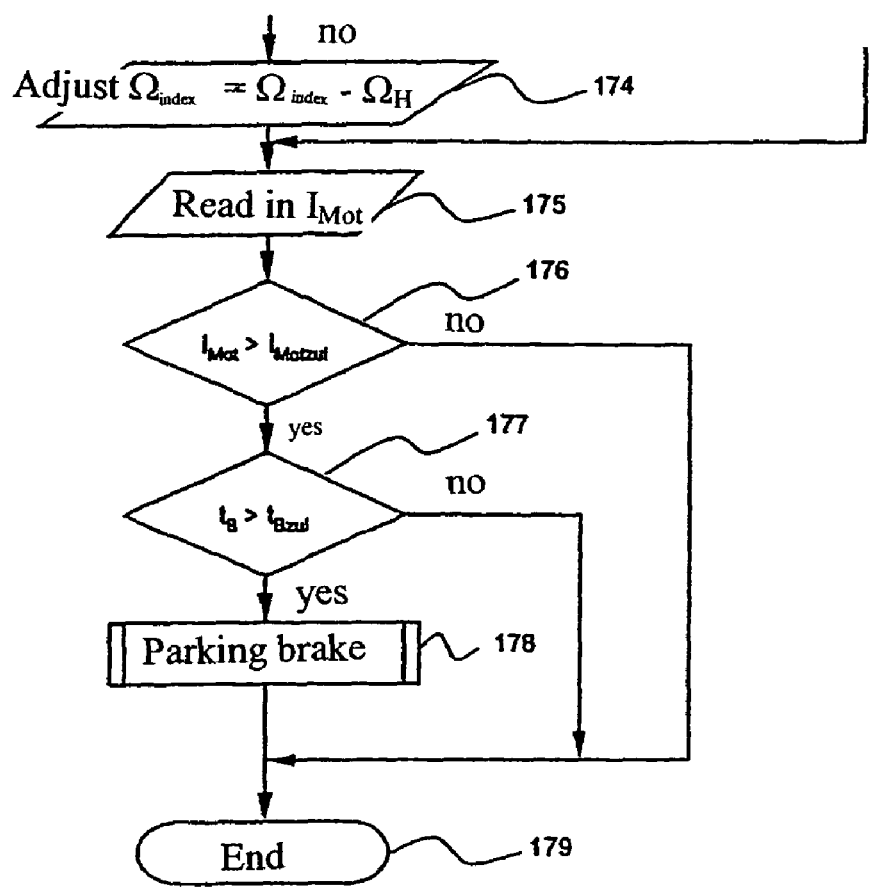

The method begins in FIG. 23 with block (160). In a subsequent data-transfer block (161), a predetermined index value ($F_{Index}$) is read in for the clamping force. As an example, this predetermined index value ($F_{Index}$) can be input by the driver via a brake-value transmitter connected to a brake pedal. A more advantageous approach, however, is to define the predetermined index value of the individual wheel brakes via a higher-level brake-management function, which determines the predetermined index value by, for example, considering a desired braking-force distribution between the vehicle axles and vehicle sides, as well as by considering aspects of wear, vehicle dynamics and if necessary further influencing variables.

In a subsequent decision block (162), a check is performed to determine whether the predetermined index value ($F_{Index}$) is below a maximum value ($F_{GMax}$). If this maximum value ($F_{GMax}$) is reached or exceeded, full braking is demanded. For this purpose, special steps, which will also be explained in more detail hereinafter, are initiated in the method. Firstly there will be analyzed the case in which the maximum value ($F_{GMax}$) is not reached, meaning that full braking is not taking place. In this case, the program branches to assignment block (163), where an index lever angle ($\Omega_{Index}$) corresponding to the predetermined index value ($F_{Index}$) is determined from a correlation characteristic ($\Omega_{Index}=f(F_{Index})$) stored in control unit (75).

The adjustment of lever (1) to index lever angle ($\Omega_{Index}$) will be explained on the basis of the subsequent steps of the method. For this purpose it is necessary to consider two further variables, the first being the permissible brake-release swiveling angle ($\Omega_H$) of lever (1) for reduction of the current drawn ($I_{Mot}$) by electric motor (74), and the second being a permissible tolerance ($\Omega_{Tol}$) for the adjustment of lever angle ($\Omega$). By brake-release swiveling angle ($\Omega_H$) there is understood that change of lever angle ($\Omega$) which occurs during a decrease of the current drawn ($I_{Mot}$) by electric motor (74) for the purpose of economizing on current and reduction of unnecessary heating of the electric motor and of control unit (75) by exploiting the hysteresis properties explained on the basis of FIGS. 21 and 22. As already explained, a decrease of motor current ($I_{Mot}$) after a desired working point has been reached leads to a relatively small decrease of lever angle ($\Omega$) and thus to a small deviation from the working point. This deviation will be advantageously taken into consideration in the present practical example, in order to further optimize the accuracy of positioning of the force-applying device.

The permissible tolerance ($\Omega_{Tol}$) represents a kind of increment for adjustment of lever (1). Adjustment of lever (1) is undertaken with a step width of this magnitude until the actual value ($F_{Actual}$) of the clamping force corresponds substantially to the predetermined index value ($F_{Index}$).

A check is performed in decision block (164) to determine whether the index lever angle ($\Omega_{Index}$) has exceeded a minimum value that can be achieved in practice and that is composed of two times the value of the brake-release swiveling angle ($\Omega_H$) plus the permissible tolerance ($\Omega_{Tol}$). If this value is not exceeded, the program branches to output block (180), in which lever (1) is set in its zero position, or in other words is adjusted to $\Omega_{Index}=0$. In addition, in a subsequent output block (181), the current supply to electric motor (74) is ended, or in other words the current is adjusted to the value of $I_{Mot}=0$. This is used on the one hand to economize on current and on the other hand to protect electric motor (74) and control unit (75) as well as to reduce the heating of these components. By virtue of the self-releasing characteristic of the force-applying device, the brake is set in driving setting and retained there.

The method according to FIG. 23 then ends with a step (182).

If, in decision block (164), index lever angle ($\Omega_{Index}$) exceeds the minimum value, the program branches to decision block (165). There and in subsequent decision block (166), checks are performed to determine whether the index lever angle ($\Omega_{Index}$) lies within an interval ($\Omega_{Actual}+\Omega_H-\Omega_{Tol}$, $\Omega_{Actual}+\Omega_H+\Omega_{Tol}$) in the range of the actual value ($\Omega_{Actual}$) of lever angle measured by the sensors. In other words, checks are performed to determine whether the index lever angle ($\Omega_{Index}$) corrected additively by the brake-release swiveling angle ($\Omega_H$) deviates by a value smaller than the negative tolerance ($-\Omega_{Tol}$) in release direction from the actual value ($\Omega_{Actual}$) of the lever angle, and whether the index lever angle ($\Omega_{Index}$) corrected additively by the brake-release swiveling angle ($\Omega_H$) deviates by a value smaller than the positive tolerance ($+\Omega_{Tol}$) in brake-application direction from the actual value ($\Omega_{Actual}$) of the lever angle. If this is the case, there is no need for adjustment of lever (1), and so the program branches to data-transfer block (175) illustrated in FIG. 24.

If, however, index value lever angle ($\Omega_{Index}$) lies outside the aforesaid interval by the actual value ($\Omega_{Actual}$) of the lever angle, a need for adjustment exists, and the program branches to output block (167). In output block (167), lever (1) is adjusted by control unit (75) to index lever angle ($\Omega_{Index}$). For this purpose, control unit (75) transmits appropriate signals to electric motor (74), until the actual value ($\Omega_{Actual}$) of the lever angle reaches the index value ($\Omega_{Index}$). In this case the actual value ($\Omega_{Actual}$) of the lever angle is continuously measured by a sensor device, preferably disposed in electric motor (74). The sensor device can be, for example, a photocell, which measures the rotation of the electric motor.

The current drawn ($I_{Mot}$) by electric motor (74) is then measured in a data-transfer block (168). In assignment block (170), this current is combined with a characteristic ($F_{Mot}$=f($I_{Mot}$)) stored in control unit (75) to determine, as the first clamping-force component ($F_{Mot}$), the component contributed to clamping-force generation by electric motor (74). In assignment block (169), a further characteristic ($F_{Fe}$=f($\Omega_{Index}$)) stored in control unit (75) is used to determine, as the assisting clamping-force component ($F_{Fe}$), the component contributed by power generator (7) to the clamping force. By addition of these two components, the actual value ($F_{Actual}$) of the clamping force is determined in assignment block (171).

Thereafter a correction of the previously determined actual value ($F_{Actual}$) of the clamping force to the predetermined index value ($F_{Index}$) is indicated in blocks (172, 173, 183, 184). Since, because of temperature influences, of brake-lining wear or of atmospheric humidity, the adjustment of the index lever angle ($\Omega_{Index}$) determined in block (163) does not always systematically permit precise adjustment of the actual value ($F_{Actual}$) of the clamping force to the predetermined index-value ($F_{Index}$), further optimization in adjustment of the clamping force is achieved by this correction.

On the basis of decision blocks (172, 173), checks are first performed to determine whether the difference—representing a kind of control deviation—between the actual value ($F_{Actual}$) of the clamping force and the predetermined index value ($F_{Index}$) is smaller in magnitude than a clamping-force tolerance value ($F_{Tol}$). The clamping-force tolerance value ($F_{Tol}$) corresponds to the permissible tolerance value ($\Omega_{Tol}$) relative to lever angle (i), as already explained hereinabove. The clamping-force tolerance value ($F_{Tol}$) is stored permanently in control unit (75). It can be determined, for example, on the basis of the correlation characteristic ($\Omega_{Index}$=f($F_{Index}$)) described in connection with block (163).

If a value below the lower interval limit ($-F_{Tol}$) is detected in block (172), the program branches to assignment block (183), where the index lever angle ($\Omega_{Index}$) to be adjusted is increased by an increment, namely the tolerance value ($\Omega_{Tol}$). Thereupon a new run takes place through blocks (167, 168, 169, 170, 171) in the manner of a program loop. In other words, the newly determined index lever angle ($\Omega_{Index}$) is adjusted, the actual value ($F_{Actual}$) of the clamping force is determined, and this value is again checked in blocks (172, 173) to determine whether it lies within the interval range ($-F_T$, $F_T$) around the predetermined index value ($F_{Index}$).

If a value above the upper interval limit ($F_T$) is detected in block (173), the program branches to assignment block (184), in which, by analogy with block (183), the index lever angle ($\Omega_{Index}$) is decreased by an increment ($\Omega_{Tol}$). Thereupon a run through blocks (167, 168, 169, 170, 171) takes place once again in the manner of a program loop, followed by a new check of the control deviation between the actual value ($F_{Actual}$) of the clamping force and the predetermined index value ($F_{Index}$). If this control deviation lies in the permissible interval ($-F_T$, $F_T$), the program branches to output block (174) illustrated in FIG. 24.

In output block (174), the previously adjusted index lever angle ($\Omega_{Index}$) is again reduced by the brake-release swiveling angle ($\Omega_H$). In other words, lever (1) is moved back slightly by the magnitude ($\Omega_H$). This is accompanied by a distinct reduction of the current drawn ($I_{Mot}$) by electric motor (74), as is also evident in FIG. 22.

In subsequent data-transfer block (175), the current drawn ($I_{Mot}$) by electric motor (74) is again read in. This current value ($I_{Mot}$) is compared with a permissible limit value ($I_{Motzul}$) in decision block (176). In addition, the braking duration ($t_B$) that has elapsed up to that point—and that also is automatically calculated by control unit (75)—is compared in a subsequent decision block (177) with an associated limit value ($t_{Bzul}$). If a value above the respective limit value is detected in both cases of blocks (176, 177), protective measures are initiated for electric motor (74), since otherwise overheating or overload of electric motor (74) can develop. In this case, therefore, a subroutine (178) is invoked in order to activate a parking mode for the entire brake system.

In this subroutine (178) it can be provided that a status message about the activation or deactivation of the parking mode is sent to a higher-level brake-management function. This brake-management function can then execute a suitable algorithm to decrease the load on the wheel-brake actuators while taking into consideration the status messages of further wheel-brake actuators.

If, in decision block (162) of FIG. 23, it is detected that full braking is taking place, the program branches to output block (185). Therein an appropriate adjustment signal is transmitted to electric motor (74), in response to which lever (1) is adjusted to the maximum possible adjustment angle ($\Omega_{Max}$) and the brake is therefore urged with the largest possible clamping force. Thereupon the sequence of the method is continued with block (175), which is illustrated in FIG. 24. Thereafter the method ends in block (179).

FIGS. 25 to 29 show a variation of the clearance limit ($\Omega=\Omega_{LS}$), abbreviated hereinafter as clearance ($\Omega_{LS}$), by adjustment of clearance actuator (90, 91, 92, 93, 94, 95, 96, 97), as well as the effects thereof on the shape of the characteristic representing input force ($F_E$) versus brake-application travel. By the term brake-application travel there is understood here any variable appropriate for quantitative characterization of the brake-application process. In the following, the swiveling angle ($\Omega$) of lever (1) will be used as the brake-application travel. In different types of designs of a force-applying device, a displacement variable, for example, may also be used.

In the process, the clearance ($\Omega_{LS}$) will be adjusted to discrete valves ($\Omega_{Ls0}$, $\Omega_{Ls1}$, $\Omega_{Ls2}$, $\Omega_{Ls3}$, $\Omega_{Ls4}$). The value ($\Omega_{LS0}$) corresponds to a desired value. In other words it brings about a desired characteristic curve of input force ($F_E$) versus brake-application travel. The value chosen for ($\Omega_{Ls1}$) is smaller than the value ($\Omega_{Ls0}$) of the clearance according to FIG. 25, and the values ($\Omega_{Ls2}$, $\Omega_{Ls3}$, $\Omega_{Ls4}$) are larger than the value ($\Omega_{Ls0}$).

Figure 25:
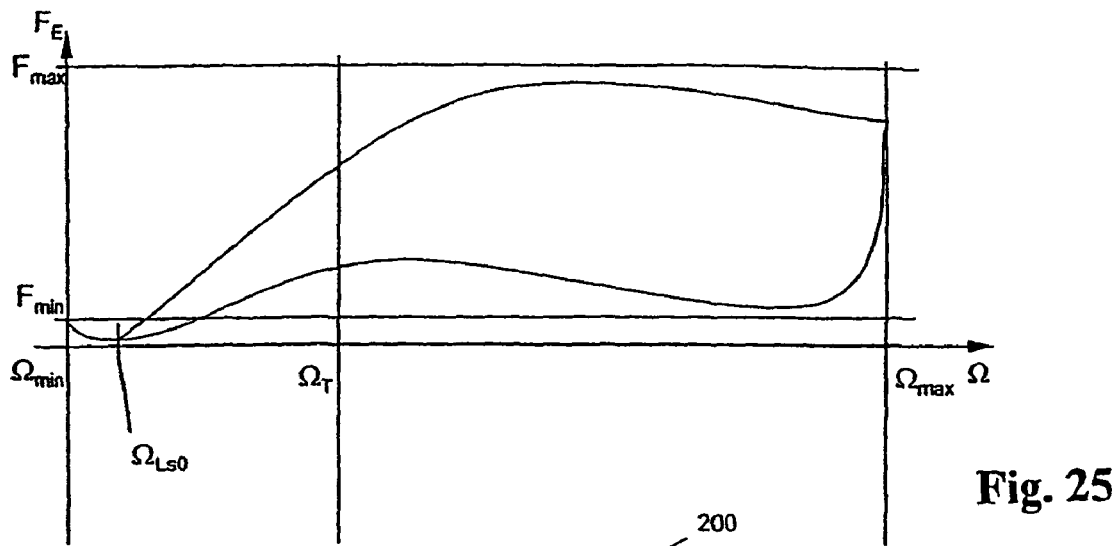
Figure 26:
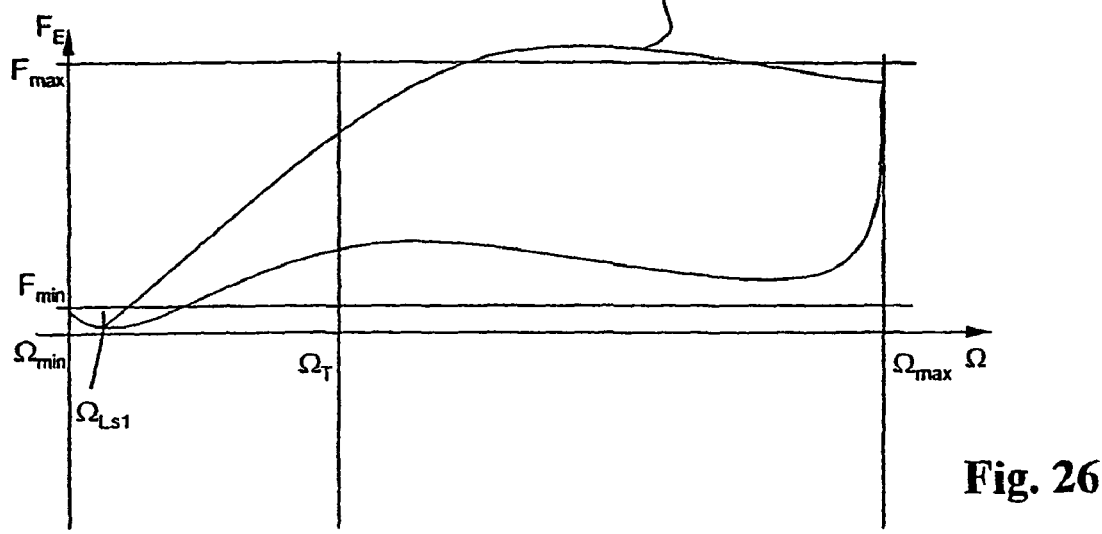
Figure 27:
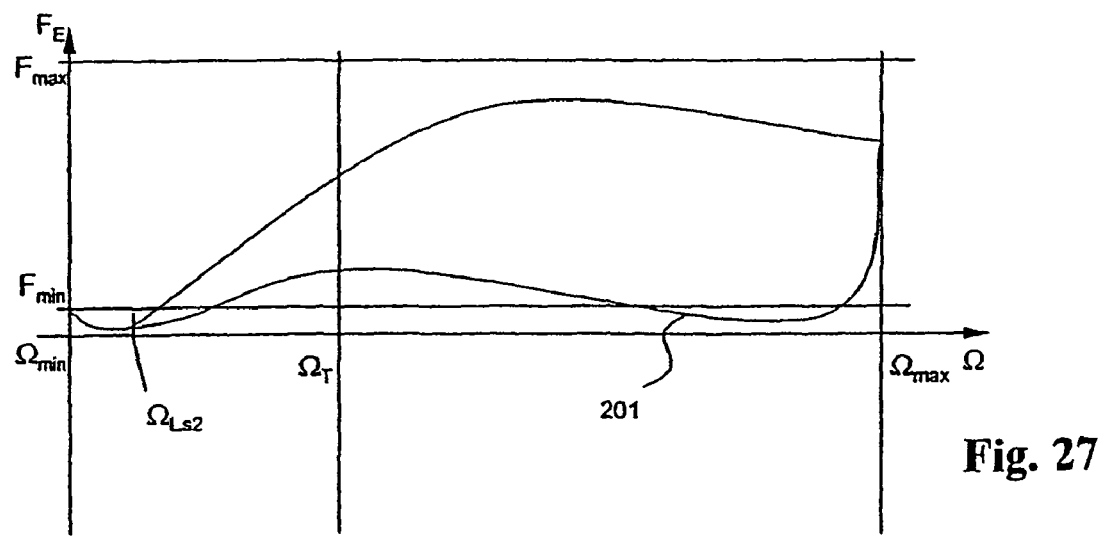

As is evident from FIGS. 25 to 27, the point at which the characteristic curve splits into upper and lower curve branches varies to the same degree as the value ($\Omega_{Ls0}$, $\Omega_{Ls1}$, $\Omega_{Ls2}$) of the clearance. This can be attributed directly to the hysteresis properties of the brake linings and of further parts of the force-applying device. At relatively large values ($\Omega_{Ls3}$, $\Omega_{Ls4}$) of the clearance, the split into two curve branches already takes place before the clearance is closed up, or in other words before the point at which the brake linings come into contact with the brake disk. This behavior is brought about by a hysteresis effect of electric motor (74).

Besides the horizontal shift of parts of the characteristic curve during variation of the clearance, a vertical shift of the characteristic curve also takes place, to the effect that the maximum point of the upper branch of the characteristic and the minimum point of the lower branch of the characteristic are shifted in the same direction. In particular, the entire characteristic curve is raised in response to a decrease of the clearance, meaning that the maximum point and minimum point rise in the direction of larger input-force demand. If the clearance is increased, both points fall in the direction of lower input-force demand. If the clearance ($\Omega_{Ls3}$, $\Omega_{Ls4}$) is sufficiently large, the minimum point is displaced into the region of negative input-force demand. With a further increase of the clearance ($\Omega_{Ls4}$), even the maximum point passes into the range of negative input-force demand. In this range of negative input-force demand, a self-applying characteristic of the force-applying device exists.

Furthermore, it is evident from FIGS. 25 to 29 that, during a variation of the clearance from small to large values, the distance between the upper and lower branches of the characteristic decreases, or in other words the hysteresis becomes smaller.

As already mentioned, it is desirable, especially in the range of large clamping forces to which large values of brake-application travel ($\Omega$) correspond, for the characteristic curve to lie within a desired range ($F_{max}$, $F_{min}$) of input force. Such a curve is illustrated in FIG. 25. Because of temperature influences, for example due to heating of the brake linings and other parts of the force-applying device as a result of frequent braking, it may occur that the characteristic curve changes according to FIG. 26, for example due to a heating-related decrease of the clearance to the value ($\Omega_{Ls1}$) In the characteristic curve according to FIG. 26, portion (200) of the characteristic passes above the maximum desired value ($F_{max}$) of the input force, and so the characteristic curve according to FIG. 26 assumes an undesired shape on the whole. Control unit (75) recognizes this and, by activating clearance actuator (90, 91, 92, 93, 94, 95, 96, 97), increases the clearance once again to the value ($\Omega_{Ls0}$), to ensure that from then on the desired characteristic curve according to FIG. 25 is obtained once again.

By analogy, in the case of cooling of brakes that previously were strongly heated, the characteristic curve may shift according to FIG. 27, for example due to a drop in temperature, leading to an increase of the clearance to the value ($\Omega_{Ls2}$) In this case, the characteristic curve passes in its lower branch of the characteristic outside the desired range, or in other words below the minimum desired value ($F_{min}$) of the input force. Portion (201) of the characteristic lies below the minimum desired input force ($F_{min}$). Control unit (75) recognizes such a deviation from the desired characteristic curve and thereupon activates clearance actuator (90, 91, 92, 93, 94, 95, 96, 97) in such a way that the clearance is decreased to the desired value ($\Omega_{LS0}$). From then on the desired characteristic curve according to FIG. 25 exists once again.

In certain conditions in which prolonged actuation of the brake is desired, for example when the vehicle is parked on a parking lot or is stopped at a traffic signal, an energy-saving mode of brake application that places little load on electric motor (74) may be desired. This operating condition will also be designated as parking-brake operation hereinafter. In such cases, control unit (75) activates clearance actuator (90, 91, 92, 93, 94, 95, 96, 97) in such a way that a larger value ($\Omega_{Ls3}$) of the clearance is achieved. In this case, a brake characteristic that is not self-releasing is obtained. This is evident in FIG. 28 from the fact that the upper branch of the characteristic runs above the abscissa and the lower branch of the characteristic runs below the abscissa. Thus a positive input force ($F_E$) is still necessary for application of the brake. After input force ($F_E$) has been canceled, the brake-application setting remains stable by virtue of the lower branch of the characteristic.

Figure 28:
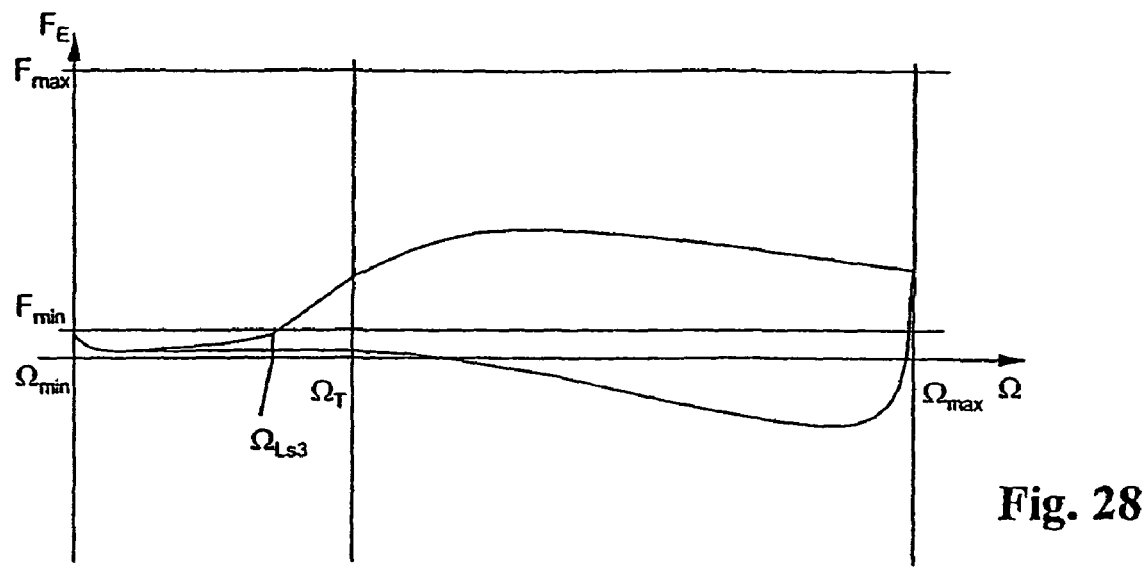

Brake release takes place only when the brake-application actuator is urged with a negative input force ($F_E$), or in other words by activation of electric motor (74) in brake-release direction. The characteristic curve according to FIG. 28 is preferably adjusted for temporary stop phases of the vehicle, such as waiting at a traffic signal or when the vehicle is parked, for example on a parking lot.

Figure 29:
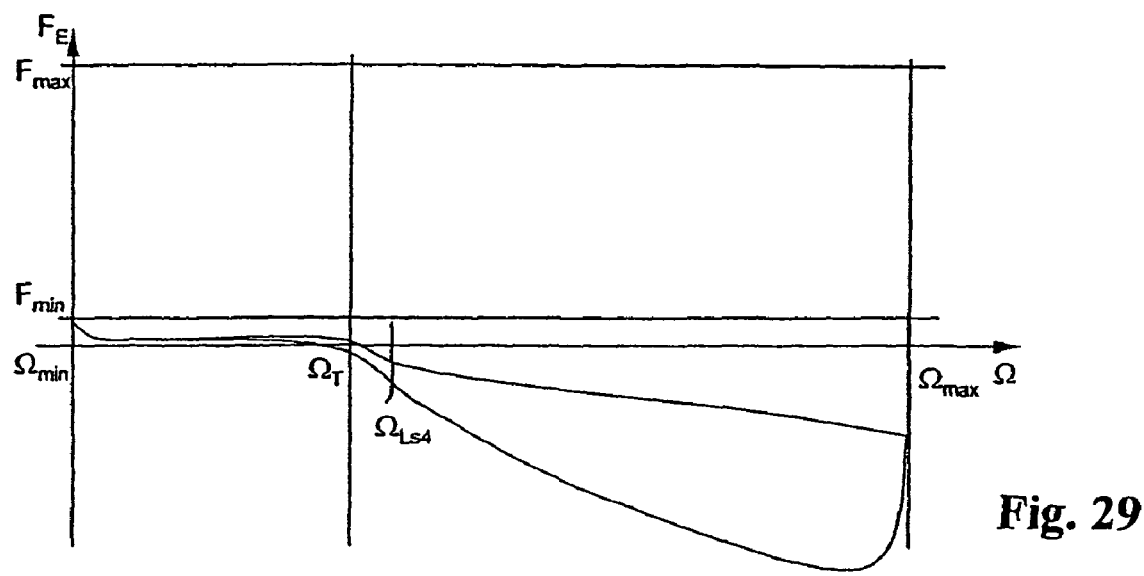

During parking-brake operation, a characteristic curve according to FIG. 29 may be established when an initially heated brake cools. In this condition, the brake characteristic at lever angles ($\Omega$) larger than the dead-center angle ($\Omega_T$) is completely self-applying, as is evident from the fact that the upper and lower branches of the characteristic lie in the range of negative input force. After the vehicle has been restarted, control unit (75) again adjusts the clearance by means of clearance actuator (90, 91, 92, 93, 94, 95, 96, 97), for example to the value ($\Omega_{Ls1}$).

Figure 30:
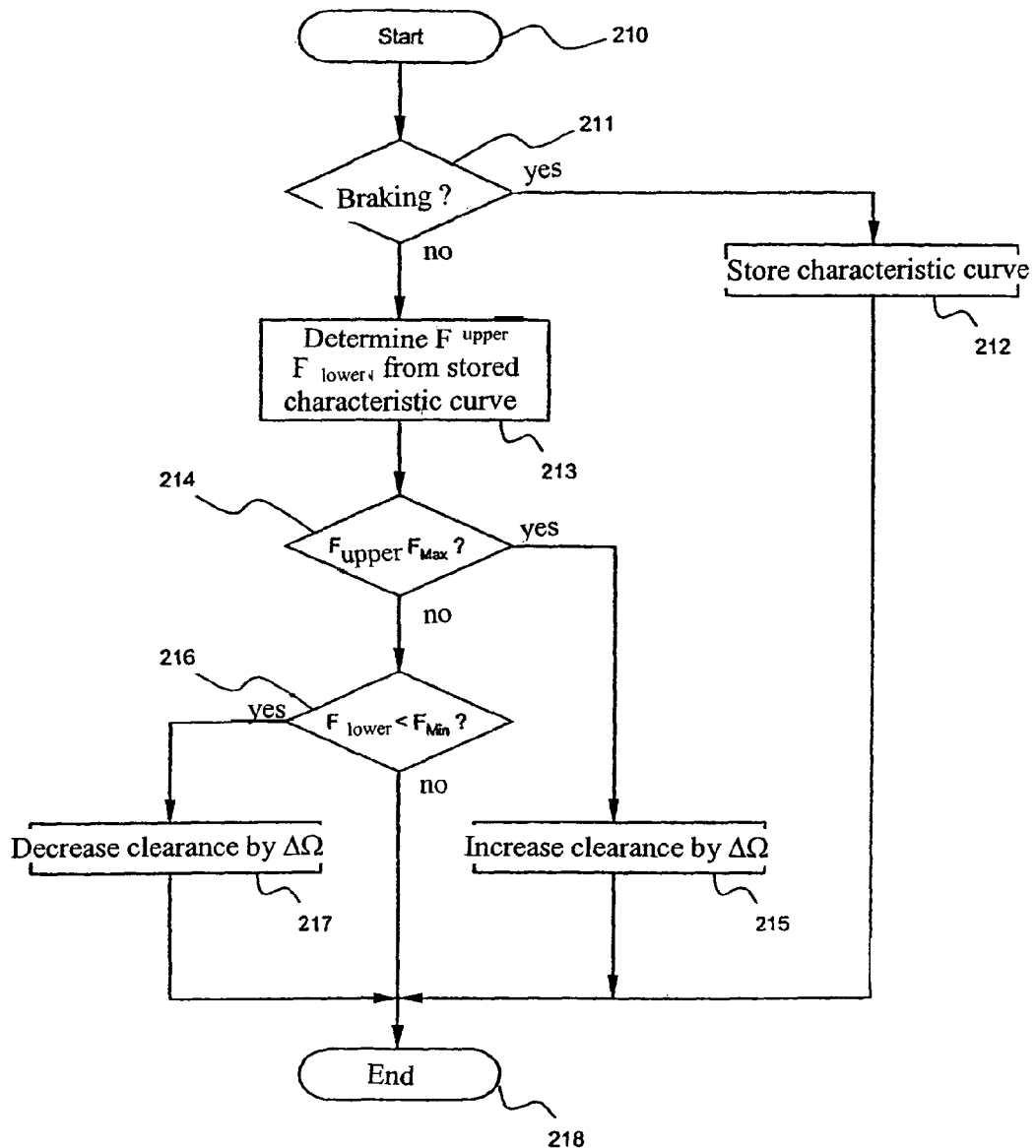

FIG. 30 shows, in the form of a flow diagram, a preferred method for adaptation of the characteristic curve of input force ($F_E$) versus brake-application travel ($\Omega$) by adjustment of the clearance by means of control of clearance actuator (90, 91, 92, 93, 94, 95, 96, 97). The method can be implemented, for example, as a subroutine of a control program provided in electronic control unit (75). The method begins with block (210).

In decision block (211), a check is performed to determine whether braking is currently taking place. In the case of braking, the program branches to block (212), in which there is stored, as the characteristic curve, the sequence of paired values of input force ($F_E$) and brake-application travel ($\Omega$) that occurs during the current braking action. From block (212) the program branches directly to block (218), with which the method ends.

If it was detected in block (211) that no braking was taking place, the program branches to block (213), in which the stored characteristic curve or if necessary a plurality of previously stored characteristic curves is or are evaluated. For this purpose it is sufficient in principle to evaluate a single, previously stored characteristic curve. Nevertheless, more reliable information is provided by storage and evaluation of a plurality of measured characteristic curves. In the case of a plurality of characteristic curves, the evaluation may contain, for example, an average formed from the stored characteristic curves. From the characteristic curve, or from the resultant characteristic curve of a plurality of characteristic curves, there are then determined characteristic variables that characterize the characteristic curve, especially with regard to curvature, maximum value, amplitude and/or hysteresis. In the present practical example, the maximum value ($F_{upper}$) of the upper branch of the characteristic as well as the minimum value ($F_{lower}$) of the lower branch of the characteristic is determined in, for example, block (213).

Thereupon an iterative adjustment of the clearance is undertaken by means of blocks (214, 215, 216, 217), in such a way that the clearance is varied stepwise until the deviation between the adjusted characteristic curve and the desired characteristic curve is smaller than a predetermined value. In this case the iterative adjustment takes place by multiple runs through the method according to FIG. 30, full braking being necessary in order to determine a new characteristic curve for each new iteration step. As a measure of the deviation between the adjusted characteristic curve and the desired characteristic curve there are used the maximum/minimum values ($F_{upper}$, $F_{lower}$), which are checked to determine whether they lie within the desired range ($F_{max}$, $F_{min}$) of input force. For this purpose a check is first performed in decision block (214) to determine whether the maximum value ($F_{up}$-

$_{per}$) exceeds the maximum desired value ($F_{max}$) of input force. If such a condition is detected, the program branches to block (215), in which the clearance is increased by actuation of clearance actuator (90, 91, 92, 93, 94, 95, 96, 97) by a predetermined increment ($\Delta\Omega$). Thereafter the method ends in block (218).

If a value exceeding the maximum desired value ($F_{max}$) of input force is not detected in decision block (214), the program branches to decision block (216). Therein the minimum value ($F_{lower}$) is checked to determine whether it lies below the minimum desired value ($F_{min}$) of input force. If such a condition is detected, the program branches to block (217), in which the clearance is decreased by the increment ($\Delta\Omega$). The method then ends in block (218). If a value below the minimum desired value ($F_{min}$) of input force was not detected in block (216), there is no need for adjustment of the clearance, since the characteristic already lies in the desired range. The method then ends with block (218).

If, during activation of the brake system, or in other words during a braking action, a failure or malfunction of the force-applying device or parts thereof is detected, an alternative program path—not illustrated in the figures—is executed. In this case, clearance actuator (90, 91, 92, 93, 94, 95, 96, 97) is extended and a clamping force and consequently a braking force is generated by means of clearance actuator (90, 91, 92, 93, 94, 95, 96, 97). The braking force then generated by clearance actuator (90, 91, 92, 93, 94, 95, 96, 97) is adjusted by input from an operator, for example via a brake pedal. For this purpose, the braking force that can be generated by clearance actuator (90, 91, 92, 93, 94, 95, 96, 97) can correspond to at least 20% of the braking force that can be generated by the force-applying device in the fault-free condition.

Figure 31:
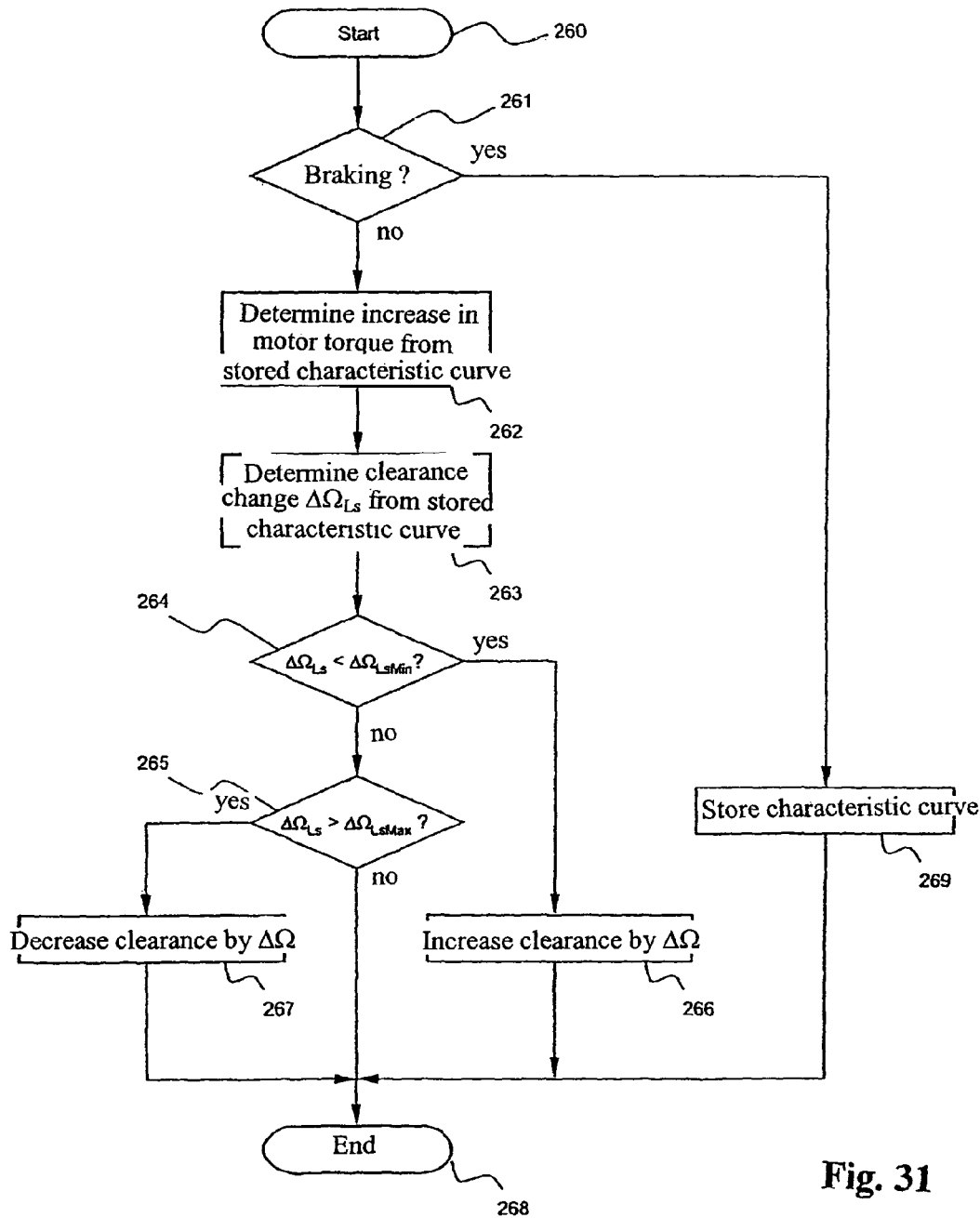

FIG. 31 illustrates, in the form of a flow diagram, a further preferred embodiment of a method for adaptation of the characteristic curve of input force ($F_E$) versus brake-application travel ($\Omega$) by adjustment of the clearance. The method begins with block (260).

In decision block (261), a check is performed to determine whether braking is currently taking place. In the case of braking, the program branches to block (269), in which there is stored, as the characteristic curve, the sequence of paired values of input force ($F_E$) and brake-application travel ($\Omega$) that occurs during the current braking action. In the preferred method of storage, there is used as memory a kind of ring buffer, in which there can be stored a predetermined number of characteristic curves, such as the last ten characteristic curves that have occurred. From block (269) the program branches directly to block (268), with which the method ends.

If it was detected in block (261) that no braking was taking place, the program branches to block (262), in which the stored characteristic curve or the stored ten characteristic curves is or are evaluated. For the evaluation there is preferably used an average characteristic curve determined by arithmetic averaging of the ten characteristic curves. From this there is determined that point of the characteristic at which a predetermined increase of input force ($F_E$) takes place. At this point, it can be assumed, with regard to the brake-application travel ($\Omega$), that the clearance has been closed up, or in other words that the value of brake-application travel ($\Omega$) existing at this point can be used as the currently existing clearance ($\Omega L_s$). In the subsequent block (263), a clearance change ($\Delta\Omega_{Ls}$) is then calculated as the difference between the currently existing clearance ($\Omega_{Ls}$) and a desired clearance, such as the value ($\Omega_{Ls0}$).

Thereupon an adjustment of the clearance is undertaken by means of blocks (264, 265, 266, 267), in such a way that the clearance is varied until the remaining clearance change ($\Delta\Omega_{Ls}$) lies in a desired range ($\Delta\Omega_{LsMin}$, $\Delta\Omega_{LsMax}$). For this purpose a check is first performed in decision block (264) to determine whether the clearance change ($\Delta\Omega_{Ls}$) is smaller than the minimum desired value ($\Delta\Omega_{LsMin}$). If such a condition is detected, the program branches to block (266), in which the clearance is increased by a predetermined increment ($\Delta\Omega$) by actuation of clearance actuator (90, 91, 92, 93, 94, 95, 96, 97). Thereafter the method ends in block (268).

If a value below the minimum desired value ($\Delta\Omega_{LsMin}$) of the clearance change ($\Delta\Omega_{Ls}$) is not detected in decision block (264), the program branches to decision block (265). Therein the clearance change ($\Delta\Omega_{Ls}$) is checked to determine whether it exceeds the maximum desired value ($\Delta\Omega_{LsMax}$). If such a condition exists, the program branches to block (267), in which the clearance is decreased by the increment ($\Delta\Omega$). The method then ends in block (268). If a value above the maximum desired value ($\Delta\Omega_{LsMax}$) of the clearance change ($\Delta\Omega_{Ls}$) was not detected in block (265), there is no need for adjustment of the clearance, since the clearance already lies in the desired range ($\Delta\Omega_{LsMin}$, $\Delta\Omega_{LsMax}$). The method then ends with block (268).

The increment ($\Delta\Omega$) can advantageously be formed as a variable value, which can be defined depending on the operating status of the brake. Thus, in the case of strongly heated brakes, such as that of the extreme driving operation yet to be explained hereinafter, it is advantageous, because of increased lining wear, to set the increment ($\Delta\Omega$) at a higher value than in normal operation.

Figure 32:
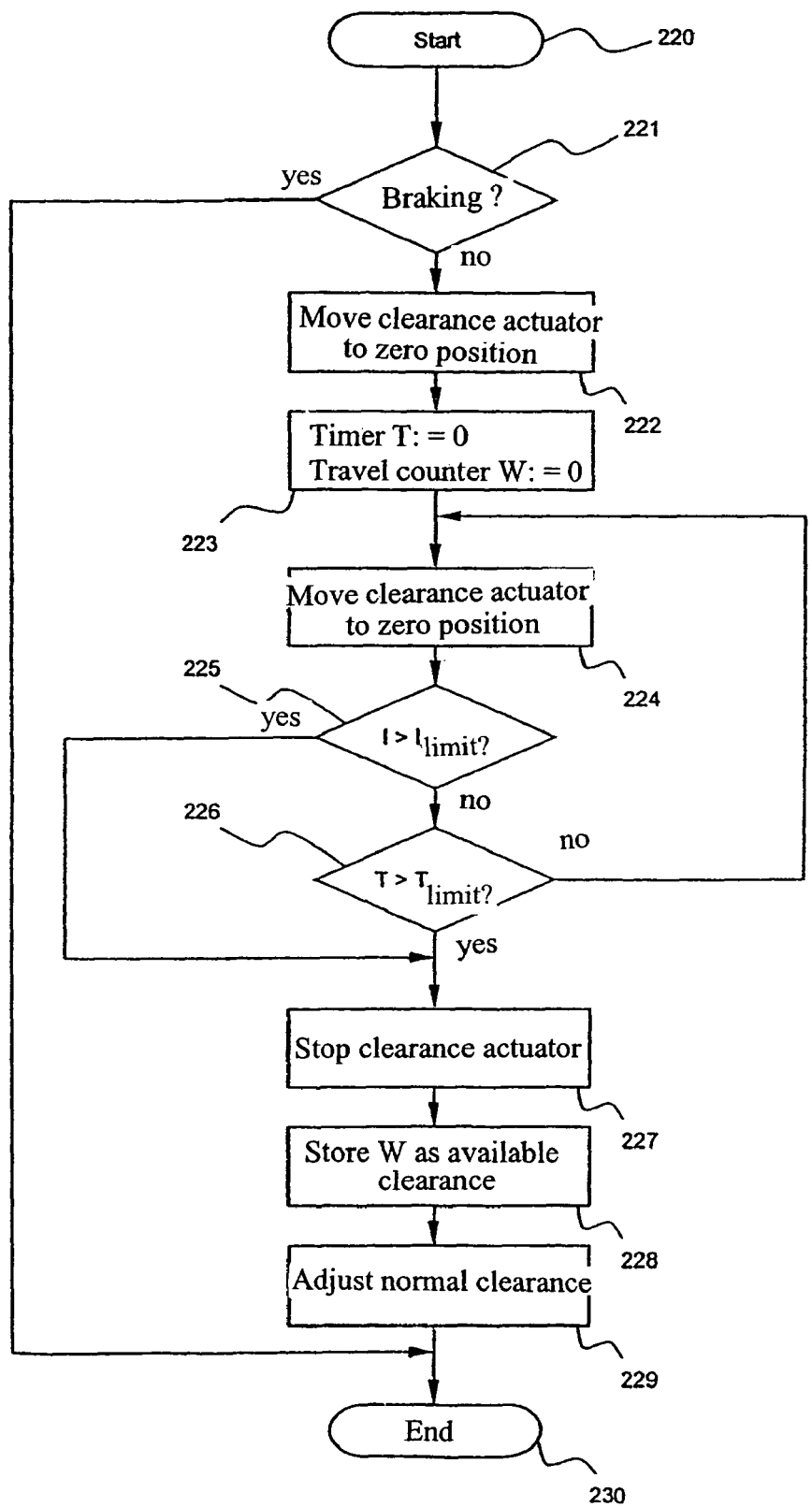

A further method that can be implemented as a subroutine in control unit (75) is illustrated in FIG. 32. The method according to FIG. 32 is used for measuring the maximum available clearance, or in other words the available adjustment range of clearance actuator (90, 91, 92, 93, 94, 95, 96, 97) from a zero position to an end position, in which the brake linings are in contact with the friction member of the brake, or in other words with the brake disk. The method begins with block (220).

In decision block (221), a check is first performed to determine whether braking is currently taking place. In the case of braking, the program branches directly to block (230), with which the method ends, since an adjustment of clearance actuator (90, 91, 92, 93, 94, 95, 96, 97) is not desired or even possible during braking. If braking is not taking place, the program branches to block (222). Therein clearance actuator (90, 91, 92, 93, 94, 95, 96, 97) is adjusted to its zero position illustrated in FIG. 11. In subsequent block (223), a timer (T) is set to the value zero. In addition, a travel counter (W) is also set to the value zero. Timer (T) is used for measurement of the time from the beginning of movement of the clearance actuator up to a time limit value ($T_{Limit}$), by which, at the latest, it is presumed that clearance actuator (90, 91, 92, 93, 94, 95, 96, 97) must have reached its end position. Travel counter (W) is used for measurement of the travel distance through which clearance actuator (90, 91, 92, 93, 94, 95, 96, 97) has moved. In the present practical example, this travel distance is measured as the change of angle of rotation through which positioning motor (90) has moved.

In block (224), clearance actuator (90, 91, 92, 93, 94, 95, 96, 97) is extended by turning on positioning motor (90). The movement is continued without interruption until the clearance actuator is stopped in block (227), provided the end position is not reached. During this movement, the change of angle of rotation through which movement has occurred is measured by means of travel counter (W). In decision block (225), the current (I) drawn by positioning motor (90) is measured as representative of the force delivered by clearance actuator (90, 91, 92, 93, 94, 95, 96, 97) and is compared with a limit value ($I_{Limit}$). Since, in the use of a conventional electric motor as positioning motor (90), a notable current increase can be expected due to mechanical blocking of the electric motor when the end position of clearance actuator (90, 91, 92, 93, 94, 95, 96, 97) is reached, the arrival at the end position can be detected by this query. If the current limit value ($I_{Limit}$) is exceeded, the program branches to block (227). Otherwise a further check is performed in decision block (226) to determine whether the time (T) elapsed since the beginning of extension of clearance actuator (90, 91, 92, 93, 94, 95, 96, 97) has exceeded a time limit value ($T_{Limit}$). If this time limit value has been exceeded, it can also be assessed as an indication that the end position of clearance actuator (90, 91, 92, 93, 94, 95, 96, 97) has been reached. The double query in blocks (225, 226) is provided for safety reasons. If both checks in blocks (225, 226) prove to be negative, the program branches again to block (224) and thus continues the extension movement of clearance actuator (90, 91, 92, 93, 94, 95, 96, 97).

In the other case, clearance actuator (90, 91, 92, 93, 94, 95, 96, 97) is stopped in block (227) by turning off positioning motor (90). In block (228), the value reached by travel counter (W) is stored as the available clearance in control unit (75). Thereupon the normal clearance is again adjusted in block (229). This is a clearance at which the characteristic curve of the input force ($F_E$) versus brake-application travel ($\Omega$) assumes substantially the desired characteristic curve, such as illustrated in FIG. 25. The method according to FIG. 32 ends in block (230).

Figure 33:
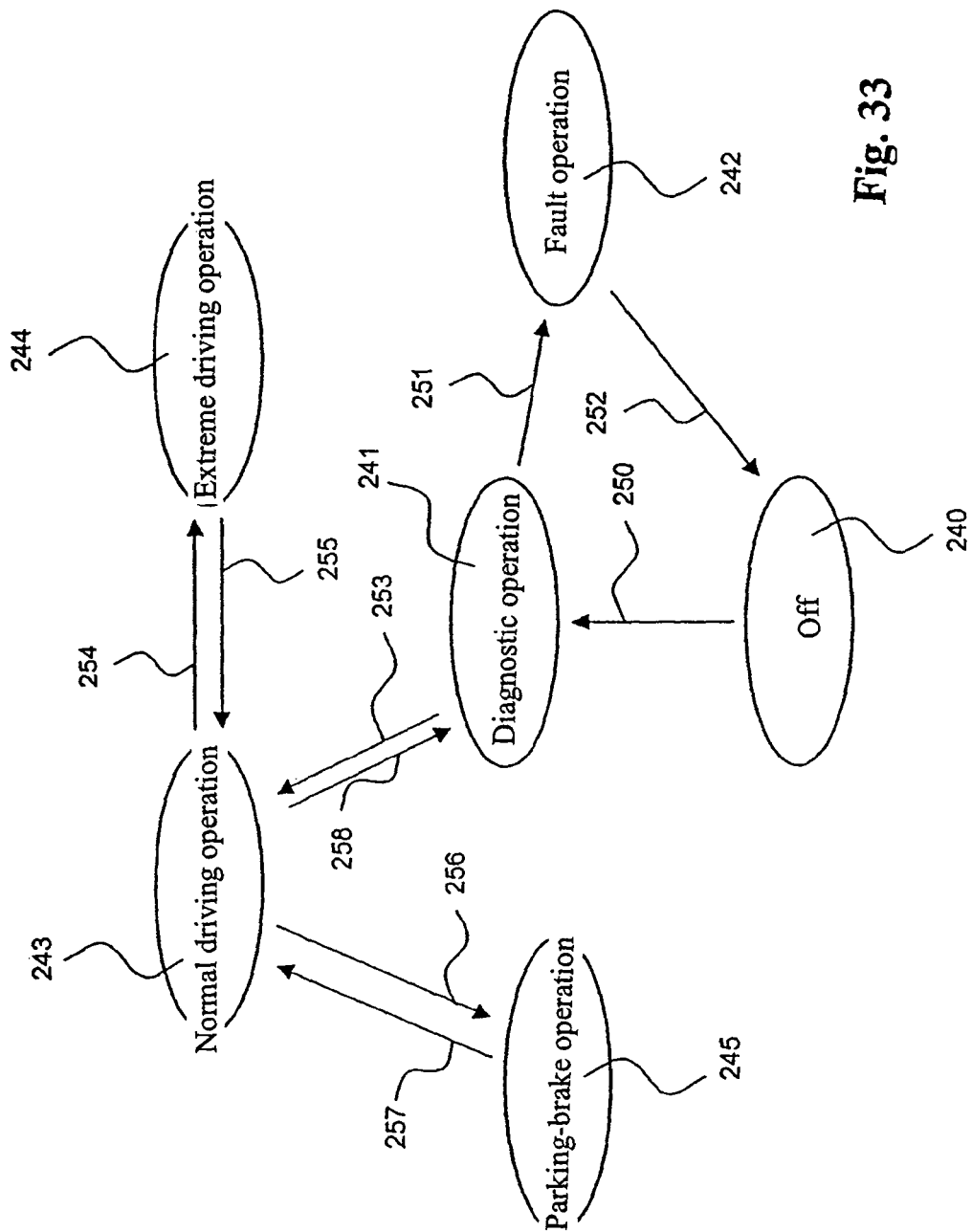

In the state-transition diagram of FIG. 33, there are illustrated advantageous modes of operation for a clearance actuator of a wheel-brake actuator. In practice, further modes of operation may be necessary and can be added. In the generalized case, the illustrated modes of operation can also be employed as modes of operation of the entire brake system.

The starting point of the diagram of FIG. 33 is mode of operation (240). In mode of operation (240), at least the wheel-brake actuator and if necessary also the entire brake system is turned off, for example via the ignition switch of the vehicle. Mode of operation (240) can be exited by state transition (250). In practice, state transition (250) is preferably implemented by turning on the power supply, for example by turning on the ignition switch. State transition (250) leads to mode of operation (241), which is designated diagnostic operation. In diagnostic operation, there are executed numerous functions used to check the wheel-brake actuator in the electrical and mechanical respect and also to check further parts of the brake system. During diagnostic operation, therefore, all electrical connections from control unit (75) to actuators (74, 90) and to the sensors are first checked for plausible signals. Checks are also performed to determine whether undesired electrical conditions such as short circuits or broken conductors are present. As part of the mechanical test, it is preferably provided that the maximum available clearance is determined by actuation of clearance actuator (90, 91, 92, 93, 94, 95, 96, 97) according to the procedure described on the basis of FIG. 32. Hereby the ability of clearance actuator (90, 91, 92, 93, 94, 95, 96, 97) to function is simultaneously checked. After the maximum available clearance has been determined, the clearance is adjusted, during diagnostic operation, to a standard value stored in the control unit.

During diagnostic operation, the normal brake function is suppressed at first. Thus actuation of the brake pedal by the driver does not yet lead to any selective brake application. After the clearance has been determined, an initial determination is made of the currently existing characteristic curve of the brake-application actuator by a brake-application process initiated as part of the diagnostic operation. After a first characteristic curve has been recorded, it is evaluated according to one of the methods of FIG. 30 or 31, and the described iterative adaptation of the clearance is performed. During diagnostic operation, the sequence of the method according to FIG. 30 or 31 can also be performed several times, until the measured characteristic curve approximates a desired characteristic curve. The purpose is to ensure, on the one hand, that electric motor (74) can apply the brake in safe operational manner and, on the other hand, that the brake has a self-releasing characteristic.

In a vehicle having a plurality of wheel-brake actuators of the type described hereinabove, it is advisable to ensure that diagnostic operation, during which the brake must be released temporarily, takes place in sufficiently coordinated manner that the vehicle is securely immobilized, especially on road gradients. Various methods can be advantageously employed for this purpose. One example is a central control system, which assigns permissives to the individual control units of the wheel-brake actuators in order that they can perform diagnostic operation. Central control can be exercised, for example, by a central control unit or even by one of the control units of the wheel-brake actuators. It is also advantageous to provide for staggering the wheel-brake actuators over time during performance of diagnostic operation. This can be accomplished, for example, by making a fixed time interval—in which the diagnostic operation must be performed—available to each wheel-brake actuator after the ignition has been turned on. The individual time intervals for the wheel-brake actuators must then be appropriately defined, so that they do not overlap. A further advantageous option for coordination comprises a kind of chain or staggered function, wherein a permanently defined wheel-brake actuator begins diagnostic operation and communicates the end of its diagnostic operation to another wheel-brake actuator, which subsequently performs its diagnostic operation and in turn signals completion to a further wheel-brake actuator. In this way coordination is possible even without a centralized function.

A further, particularly time-saving procedure for adjustment of a clearance value corresponding to a desired characteristic curve can take place as follows:

The force-applying device is adjusted to a brake-application angle of, for example, $\Omega$=15 degrees; the input force ($F_E$) then exerted by electric motor (74) on lever (1) is determined, for example, from the current drawn by electric motor (74); brake application is canceled again ($\Omega$=0 degrees); and the clearance is adjusted as follows as a function of the measured values of the input force ($F_E$):

| | |
|---|---|
| $F_E$ <- 5 N (newton): | The clearance must be decreased by 1.0 mm |
| $F_E$ < 0 N: | The clearance must be decreased by 0.5 mm |
| $F_E$ < 3 N: | The clearance must be decreased by 0.3 mm |
| $F_E$ < 5 N: | The clearance must be decreased by 0.1 mm |
| $F_E$ > 14 N: | The clearance must be increased by 0.1 mm |
| $F_E$ > 16 N: | The clearance must be increased by 0.2 mm |

These steps are repeated until the input force ($F_E$) occurring during brake application at the brake-application angle of $\Omega$=15 degrees lies in the range of 5 to 13 N. If this is not possible, the mode of operation is switched via state transition (251) from diagnostic operation (241) to fault operation (242).

In the next step, brake application is adjusted to full-braking setting, or in other words to maximum brake-application angle ($\Omega$), and input force ($F_E$) is evaluated again. In this case the input force ($F_E$) must lie in a range of 6 to 16 N during brake application and, because of the desired self-releasing characteristic, must always be greater than 0 N during brake release. If these values are not reached, the clearance is adjusted as follows:

| | |
|---|---|
| $F_E$ during brake application < 6 N: | The clearance must be decreased by 0.05 mm |
| $F_E$ during brake application > 16 N: | The clearance must be increased by 0.05 mm |
| $F_E$ during brake release < 0 N: | The clearance must be decreased by 0.05 mm |

Thereafter there is determined and stored the swiveling angle ($\Omega$) at which input force ($F_E$) reaches a predefined higher value.

Thereupon the diagnostic mode ends, and operation is continued by means of state transition (253) to mode of operation (243), provided no faults were detected during diagnostic operation. In the aforesaid fault situation, the mode of operation is switched by means of state transition (251) to fault operation (242). In this mode of operation, a warning signal is generated, for example by turning on a warning light. In this case, in order to permit the vehicle to be driven to a repair shop, the brake system must not remain in fully braked position. If adequate total braking force of the brake system is still available despite recognition of a fault, for example because only one wheel brake exhibits a defect, this brake is preferably moved into released position. This mode of operation can be canceled via state transition (252), for example by turning off the ignition. Hereby the wheel-brake actuator or the brake system returns to mode of operation (240).

Mode of operation (243) is established for normal driving operation. It includes all conditions that do not require any measures—with respect to the clearance adjustment—deviating from the type of adjustment of clearance actuator (90, 91, 92, 93, 94, 95, 96, 97) described on the basis of FIGS. 30 and 31. From normal driving operation, it is possible to change back to diagnostic operation (241) via state transition (258). State transition (258) can be initiated, for example, by connecting a diagnostic unit and transmitting a diagnosis-activation command to the brake system.

In normal driving operation, clearance readjustment is also performed to compensate for brake-lining wear among other factors. From normal driving operation (243), it is possible to change to mode of operation (244) via state transition (254). Mode of operation (244) relates to all operating conditions that occur during abnormally high load on the brakes, such as prolonged downhill driving, and it will be designated hereinafter as extreme driving operation. State transition (254) is executed if, during normal driving operation, the temperature ($\theta$) of at least one brake part, especially of a brake lining, exceeds a temperature limit value ($\theta_{max}$). This temperature ($\theta$) can be measured by means of a temperature sensor. Nevertheless, it is more advantageous to avoid a temperature sensor and to perform the determination of temperature by means of a temperature model or an energy model. For this purpose, a temperature or energy value is calculated theoretically from the ratio between the times for which the brake is actuated and the times of unactuated condition, during which the brake is able to cool. Alternatively, or in addition, state transition (254) can be advantageously initiated if a decrease of the clearance ($\Omega_{Ls}$) is detected, for example by monitoring the point at which input force ($F_E$) increases, as already explained on the basis of block (262) of FIG. 31.

In extreme driving operation (244), preferably an alarm signal, such as a warning light is activated, in order to alert the vehicle driver to this condition and warn about unnecessary brake actuation.

In extreme driving operation (244), it can be assumed that temperature-induced expansion of brake linings (40, 42) and of other brake parts will occur, thus decreasing the clearance. To compensate for this effect, the clearance is increased again by adjustment of clearance actuator (90, 91, 92, 93, 94, 95, 96, 97), or in other words is adjusted to the desired normal value. From mode of operation (244), a change can be made via state transition (255) to mode of operation (243). State transition (255) is initiated, for example, in response to a time criterion, for example when the brake has not been actuated for a predetermined time, such as one hour.

On the other hand, a change from mode of operation (243) to mode of operation (245) can be made via state transition (256). Mode of operation (245) is also designated as parking-brake operation. To initiate state transition (256), preferably a measurement is made of the duration of a constant brake actuation. If a predetermined value of the duration is exceeded, state transition (256) then takes place. Alternatively, state transition (256) can be initiated by a further actuating means, such as a manual brake lever, which can be constructed as a device that can be adjusted in steps.

A special characteristic of parking-brake operation is that, in contrast to normal driving operation or extreme driving operation, it is relatively infrequent that a change of braking force is needed. Parking-brake operation (245) is used to establish a relatively high braking force, by which the vehicle is safely immobilized, even on road gradients. In this case, the current consumption of electric motor (74) and the load thereon must be as small as possible. In particular, electric motor (74) must not be subjected to continuous energization with relatively high current values, since this could lead to undesired heating of electric motor (74) or to damage thereto.

In parking-brake operation, an increase of the clearance takes place, for example as illustrated in FIG. 28, with the effect that the brake assumes a non-self-releasing characteristic. For example, the clearance may be increased from the current position by 0.3 mm. Thereafter swiveling angle ($\Omega$) is set to maximum value, so that full braking takes place. Thereupon the input force ($F_E$) generated by electric motor (74) is correspondingly reduced or canceled.

From parking-brake operation (245), it is possible to change to normal driving operation (243) via state transition (257). State transition (257) can advantageously take place by releasing the further actuating means (manual brake lever) or also by a change of the brake-actuation request by the driver.

By further state transitions not illustrated in FIG. 32, it is possible to change directly from any mode of operation (241, 243, 244, 245) to mode of operation (240), for example by turning off the ignition.

As the electric actuator, it will be assumed in the following practical example that there is used a conventional electric motor, to which a rotary movement can be delivered. The rotary movement may take place in two directions of movement, such as counterclockwise rotation and clockwise rotation. Hereinafter these directions of movement will be designated in general as "A" and "B". The electric motor is in rigid mechanical communication with a force-applying device of a brake for a vehicle, as is known, for example, from the prior art cited in the introduction. The force-applying device may also perform movements in two directions. One direction of movement leads to application of the brake and will be referred to hereinafter as brake-application direction. The other direction of movement leads to release of the brake, and will be referred to hereinafter as brake-release direction. The maximum position achievable in brake-release direction corresponds to a completely released brake, and is designated as released position.

Figure 34:
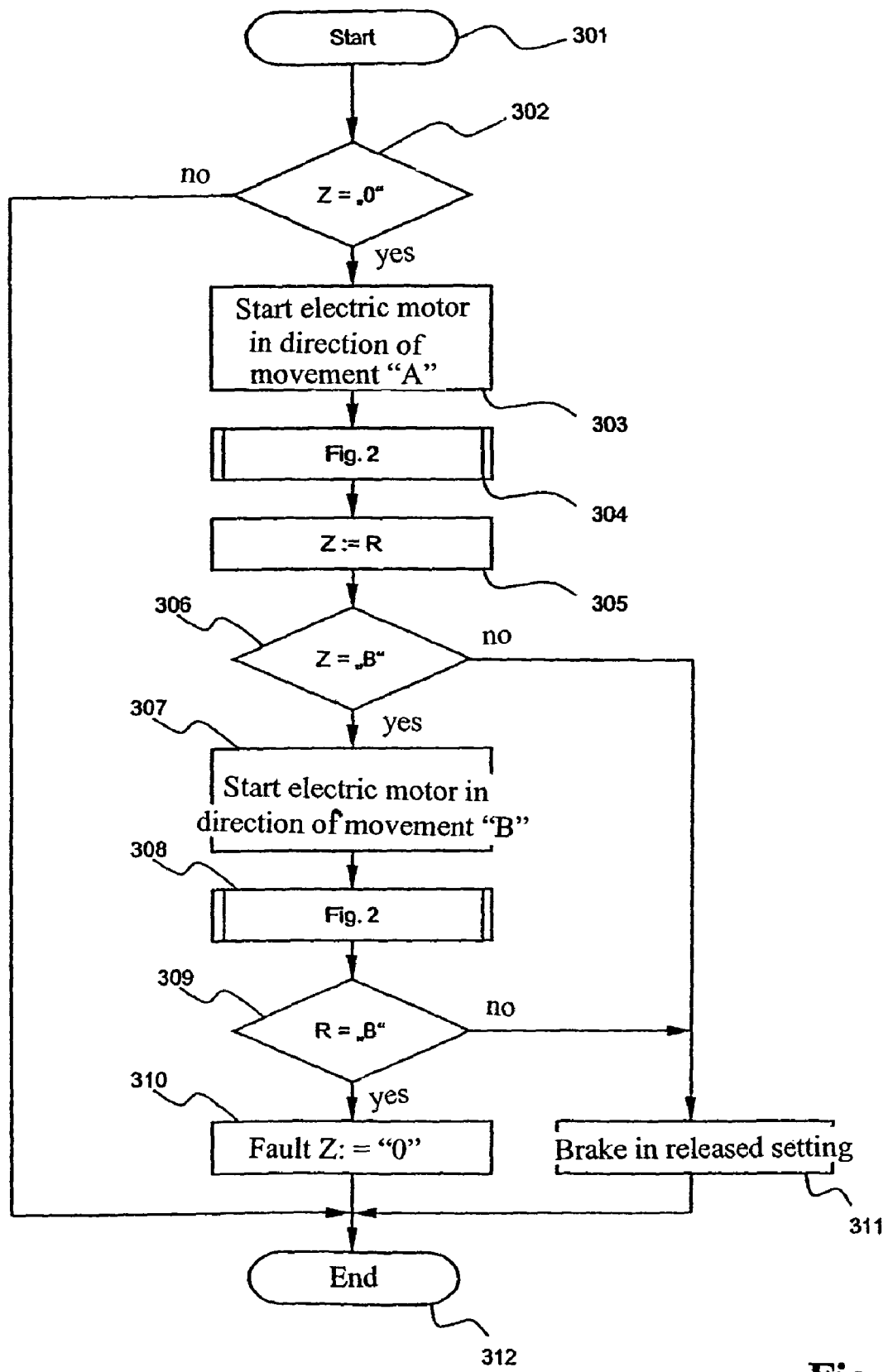

The method according to FIG. 34 begins with block (301). In a subsequent decision block (302), a correlation memory (Z) is queried. Correlation memory (Z) is defined in such a way that, after successful execution of the inventive method, it contains the information as to which of the possible directions of movement ("A", "B") of the electric motor causes the force-applying device connected to the electric motor to perform a movement in brake-application direction. The opposite direction of movement would therefore lead to movement in the brake-release direction. Correlation memory (Z) can therefore contain either one of the two possible correlations ("A", "B") or it can contain a neutral value ("0") in the cleared condition. This neutral value ("0") would be present during startup of the brake actuator for the first time, by the manufacturer, for example.

In decision block (302), a check is therefore performed to determine whether correlation memory (Z) contains the neutral value ("0"), meaning that none of the possible correlations ("A", "B") is yet stored therein. If one of the possible correlations ("A", "B") is already stored, the program branches directly to block (312), with which the method ends. Otherwise the correlation is automatically determined in the manner described below, beginning with block (303).

In block (303), there is initiated a predetermined test cycle, with the effect that the electric motor is first started in one ("A") of its two possible directions of movement ("A", "B"). Thereupon a subroutine illustrated in more detail in FIG. 35 is called up in block (304).

Figure 35:
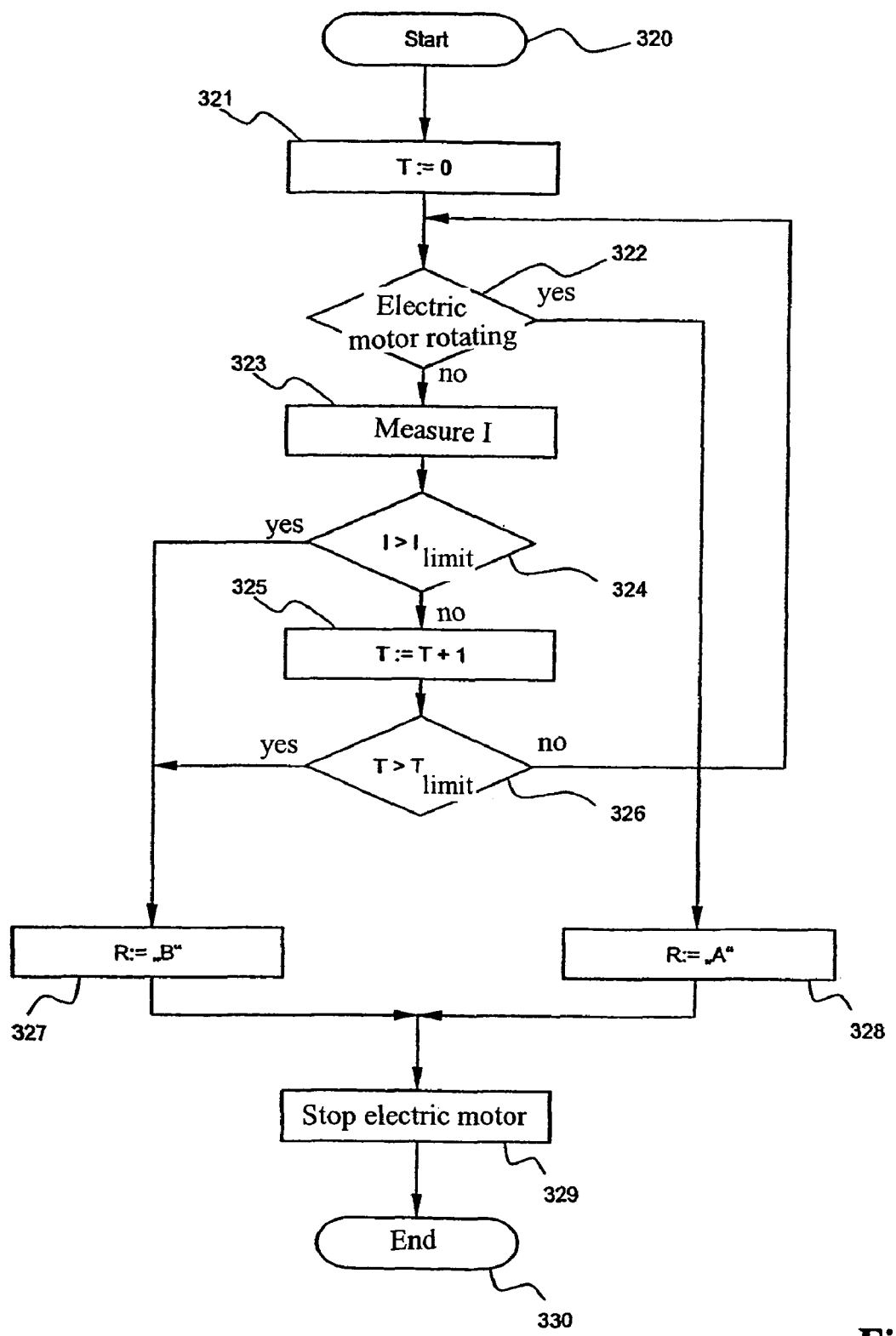

The subroutine according to FIG. 35 begins with block (320). In a subsequent assignment block (321), a timer (T) is set to an initial value (0). Thereupon a check is performed in decision block (322) to determine whether the electric motor, which was started previously in block (303) of FIG. 34, is performing a rotary movement. This is preferably sensed by a rotary-movement sensor device, such as a photocell or an inductive sensor, disposed in or on the electric motor. The check of whether the electric motor is rotating indirectly represents a check of whether the force-applying device is performing a movement in brake-application direction. In the present practical example, it was assumed as the initial condition that the force-applying device is in released position and therefore cannot be moved further in brake-release direction. Thus the force-applying device and accordingly the electric motor communicating mechanically therewith can perform a movement only if such movement takes place in brake-application direction.

If it is detected in decision block (322) that the electric motor is performing a rotary movement, the program branches to assignment block (328), where a result variable (R) is set to the value ("A"). Thereupon the electric motor is stopped in block (329), whereupon the subroutine according to FIG. 35 is ended in block (330).

If, however, it is detected in decision block (322) that the electric motor is not performing a rotary movement, the program branches to block (323). Therein the current drawn (I) by the electric motor is measured, for example by a measuring device on one of the power-supply conductors of the electric motor. Thereupon a check is performed in decision block (324) to determine whether the current drawn (I) exceeds a current limit value ($I_{Limit}$). If this is the case, the program branches to assignment block (327). A value above the current limit value ($I_{Limit}$) is used as an indication that the force-applying device is not performing any movement in brake-application direction. In this case, it can be assumed that direction of movement ("A") of the electric motor correlates with the brake-release direction of the force-applying device. In block (327), therefore, the result variable (R) is set to a value ("B"), thus indicating that direction of movement ("B") of the electric motor correlates with the brake-application direction of the force-applying device. Thereupon the subroutine according to FIG. 35 is ended via the already explained blocks (329, 330).

If, however, it is detected in decision block (324) that the current limit value ($I_{Limit}$) has not been exceeded, the program branches to assignment block (325). Therein timer (T) is incremented. In a subsequent decision block (326), timer (T) is checked to determine whether a time limit value ($T_{Limit}$) has been exceeded. Hereby the maximum actuation time of the electric motor is limited. If the time limit value ($T_{Limit}$) has not yet been exceeded, the program branches again, in the manner of a program loop, to decision block (322), so that the explained checks can be performed again in decision blocks (322, 324, 326) until a condition that ends the program loop exists.

If the time limit value ($T_{Limit}$) is exceeded without an indication in decision block (322) that the electric motor is performing a rotary movement, it can also be assumed that the direction of movement ("A") of the electric motor correlates not with the brake-application direction but with the brake-release direction of the force-applying device. Thus the program also branches to assignment block (327), in which result variable (R) is set to the value ("B"). After execution of block (329), the subroutine according to FIG. 35 then ends in block (330), as already explained.

Thereupon assignment block (305) in FIG. 34 is executed. Therein correlation memory (Z) is set to the result variable (R) of the subroutine according to FIG. 35. In subsequent decision block (306), a check is performed to determine whether correlation memory (Z) contains the value ("B"). If the value ("B") is present, it indicates that, in the previously executed test cycle, comprising blocks (303, 304), direction of movement "A" of the electric motor has not led to brake application, but instead the electric motor has not performed any movement. Possible causes of this may be that the electric motor was mechanically blocked by the force-applying device, as is possible in released position thereof, or that the electric motor or other parts of the brake actuator is suffering from a defect. In order to recognize the possibility of a defect and to preclude it as a risk factor for subsequent operation of the brake, a second test cycle is begun in block (307) whenever the condition Z="B" has been recognized as satisfied in decision block (306).

In the first step of the second test cycle, the electric motor is started in its second direction of movement ("B") in block (307). If no defect were to be present, it can be expected that the force-applying device will perform a movement in brake-application direction. In order to verify this, the subroutine according to FIG. 35 is subsequently called up again in block (308). This subroutine returns result variable (R) as the result, as already explained. This is evaluated in FIG. 34 in decision block (309). If result variable (R) contains the value ("B"), this indicates that the electric motor has again not performed a rotary movement, and accordingly the force-applying device also has been unable to perform a movement in brake-application direction. Such behavior indicates a fault. In such a case, therefore, the program branches to block (310), in which fault recognition and indication take place. For example, a warning light visible to the vehicle driver can be turned on. Moreover, since determination of the correlation of the directions of movement is not possible, correlation memory (Z) is again set to the neutral value (0). Thereupon the method according to FIG. 34 ends with block (312).

If the condition Z="B" was already not satisfied in decision block (306), indicating that the electric motor has performed a movement previously, a further check of the electric motor by the second test cycle is not necessary, and the program branches directly to block (311). In block (311), the force-applying device actuated previously in brake-application direction is again set in released setting. Thereafter the method ends in block (312). If the second test cycle comprising blocks (307, 308) is executed, and if no defect is detected in decision block (309), the program also branches to block (311). Herewith the brake is again moved to released position, whereupon the method ends in block (312).

As the result of the method explained hereinabove, a correlation between the direction of movement of the electric actuator and the direction of movement of the force-applying device was determined and stored in correlation memory (Z). In the present practical example, correlation memory (Z) contains that direction of movement of the electric motor which leads to movement of the force-applying device in brake-application direction. Hereby a unique correlation between the directions of movement is defined.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A brake actuation device, comprising:
   a lever having a power point and a fulcrum, the lever providing an output force to a brake;
   a power generator operable to apply an input force on the lever at an operating angle relative to the longitudinal axis of the lever; and
   a power transfer member operable to vary the operating angle as a function of an external input force so as to adjust a magnitude of a component of said input force in a direction assisting movement of the lever, said power transfer member including a cam surface,
   wherein the power generator operates on the lever at the power point and wherein the lever emits the output force.

2. The apparatus according to claim 1, further comprising power translation means and wherein the power generator transfers force to the lever at a power point on the lever via force transferred from the power generator through the power translation means and applied at a variable power-transfer point, change in the variable power-transfer point effecting associated variation in the operating angle.

3. The apparatus according to claim 1, wherein the power generator transfers force to the lever at the same power point on the lever at every adjustable value of the operating angle.

4. The apparatus according to claim 2, wherein the variable power-transfer point is varied along a preselected curved path.

5. The apparatus according to claim 4, wherein the curved path is configured as a contour for guiding the movement of the power translation means.

6. The apparatus according to claim 1, wherein the means for varying the operating angle include the power translation means.

7. The apparatus according to claim 1, wherein the lever is adjustable in an angular range from a preselected minimum value to a preselected maximum value.

8. The apparatus according to claim 7, wherein the output force acts on an at least partly elastic force-receiving device, the at least partly elastic force-receiving device generating an opposing force in response to the output force.

9. The apparatus according to claim 8, further comprising means for transforming the input variable to an input force that acts in brake-application direction to enhance the force exerted by the power generator on the lever.

10. The apparatus according to claim 9, wherein the means for varying the operating angle include means for varying the angular position of the lever, and wherein the means for transforming the input variable to force acts on the lever via the means for varying the angular position of the lever.

11. The apparatus according to claim 9, wherein the means for transforming the input variable to force is disposed in fixed position relative to the at least partly elastic force-receiving device.

12. The apparatus according to claim 8, wherein the power generator acts to assist the lever in an extension direction relative to the at least partly elastic force-receiving device, and wherein the opposing force acts to assist reset of the power generator in a retraction direction.

13. The apparatus according to claim 9, wherein energy equilibrium is established at least approximately among energy components generated by the input force, the force exerted by the power generator on the lever and the opposing force.

14. The apparatus according to claim 8, wherein the at least partly elastic force-receiving device is part of a vehicle brake.

15. The apparatus according to claim 7, further comprising a mechanical stop disposed proximate an end of the angular range associated with at least one of the preselected minimum value and the preselected maximum value.

16. The apparatus according to claim 8, wherein the lever assumes a specified angular position when at least one of the input variable and the input force fails.

17. The apparatus according to claim 15, wherein the lever assumes a specified end position by means of the force applied thereon by the power generator.

18. The apparatus according to claim 17, wherein the specified end position corresponds to the end of the angular range associated with at least one of the preselected minimum value and the preselected maximum value.

19. The apparatus according to claim 1, further comprising a clearance actuator for controlling variation of brake clearance.

20. An electrically actuatable brake actuation device, comprising:
   a force-applying device providing an output force to a brake, the force-applying device including a lever having a power point and a fulcrum;
   a power generator operable to apply an input force on the lever at an operating angle relative to the longitudinal axis of the lever, and
   a power transfer member operable to vary the operating angle as a function of an external input force so as to adjust a magnitude of a component of said input force in a direction assisting movement of the lever, said power transfer member including a cam surface; and an electric actuator in active mechanical communication with the force-applying device, the electric actuator constructed and arranged to control application and release of the force-applying device, said electric actuator providing said external input force, wherein the power generator operates on the lever at the power point and wherein the lever emits the output force.

* * * * *